United States Patent
Shan

(10) Patent No.: US 10,171,815 B2
(45) Date of Patent: Jan. 1, 2019

(54) CODING MANNER SWITCHING METHOD, TRANSMIT END, AND RECEIVE END

(71) Applicant: Huawei Device (Dongguan) Co., Ltd., Dongguan (CN)

(72) Inventor: Zhenwei Shan, Shenzhen (CN)

(73) Assignee: HUAWEI DEVICE (DONGGUAN) CO., LTD., Dongguan (CN)

(*) Notice: Subject to any disclaimer, the term of this patent is extended or adjusted under 35 U.S.C. 154(b) by 583 days.

(21) Appl. No.: 14/813,458

(22) Filed: Jul. 30, 2015

(65) Prior Publication Data

US 2015/0334400 A1 Nov. 19, 2015

Related U.S. Application Data

(63) Continuation of application No. PCT/CN2014/079118, filed on Jun. 4, 2014.

(30) Foreign Application Priority Data

Jun. 5, 2013 (CN) .......................... 2013 1 0221059

(51) Int. Cl.
*H04N 19/00* (2014.01)
*H04N 19/164* (2014.01)
(Continued)

(52) U.S. Cl.
CPC ........... *H04N 19/164* (2014.11); *H04L 43/08* (2013.01); *H04N 19/103* (2014.11); *H04N 19/12* (2014.11);
(Continued)

(58) Field of Classification Search
CPC ........................... H04N 19/164; H04N 19/103
(Continued)

(56) References Cited

U.S. PATENT DOCUMENTS

2004/0081075 A1 4/2004 Tsukakoshi
2007/0014363 A1 1/2007 Golas et al.
(Continued)

FOREIGN PATENT DOCUMENTS

CN 1764184 A 4/2006
CN 101742311 A 6/2010
(Continued)

OTHER PUBLICATIONS

Series H: Audiovisual and Multimedia Systems, Coding of moving video, Implementors Guide for H.263: "Video coding for low bit rate communication," ITU-T, H.263, Implementors' Guide, Aug. 5, 2005, 10 pages.
(Continued)

*Primary Examiner* — Jeffery A Williams
(74) *Attorney, Agent, or Firm* — Conley Rose, P.C.

(57) ABSTRACT

A coding manner switching method is provided. The method includes acquiring, by a transmit end, state information of the transmit end and/or a receive end, where the state information comprises central processing unit (CPU) usage, a network bandwidth, and electricity amount information that are of the transmit end and/or the receive end, and information about media content to be sent by the transmit end; determining whether the state information meets a preset condition, and switching a coding manner of the media content if the state information meets the preset condition; and notifying the receive end of the coding manner of the media content of the transmit end, so that the receive end determines a decoding manner of the media content according to the coding manner of the media content.

3 Claims, 6 Drawing Sheets

(51) Int. Cl.
*H04L 12/26* (2006.01)
*H04N 19/103* (2014.01)
*H04N 19/12* (2014.01)
*H04N 19/136* (2014.01)
*H04N 19/146* (2014.01)
*H04N 19/156* (2014.01)

(52) U.S. Cl.
CPC ......... *H04N 19/136* (2014.11); *H04N 19/146* (2014.11); *H04N 19/156* (2014.11)

(58) Field of Classification Search
USPC .................................................. 375/240.06
See application file for complete search history.

(56) References Cited

U.S. PATENT DOCUMENTS

| | | | |
|---|---|---|---|
| 2008/0144949 | A1 | 6/2008 | Inoue |
| 2010/0128777 | A1 | 5/2010 | Garg et al. |
| 2012/0106328 | A1 | 5/2012 | Gan et al. |
| 2013/0034146 | A1* | 2/2013 | Jeong ............... H04N 7/147 375/240.01 |
| 2013/0034151 | A1 | 2/2013 | Zhou et al. |
| 2013/0254418 | A1* | 9/2013 | Zhang ............... H04L 65/60 709/231 |
| 2014/0036993 | A1 | 2/2014 | Bae |

FOREIGN PATENT DOCUMENTS

| | | |
|---|---|---|
| CN | 102299762 A | 12/2011 |
| CN | 102466745 A | 5/2012 |
| CN | 102572120 A | 7/2012 |

OTHER PUBLICATIONS

Vanne, J., et al. "Comparative Rate-Distortion-Complexity Analysis of HEVC and AVC Video Codecs," IEEE Transactions on Circuits and Systems for Video Technology, vol. 22, No. 12, Dec. 2012, pp. 1885-1898.
Foreign Communication From a Counterpart Application, European Application No. 14807574.0, Extended European Search Report dated Feb. 2, 2016, 8 pages.
Kannangara, C. S., et al., "Computational Control of an H.264 Encoder Through Lagrangian Cost Function Estimation," XP002438222, Sep. 15, 2005, 4 pages.
Foreign Communication From a Counterpart Application, European Application No. 14807574.0, European Summons to attend Oral Proceedings dated Jul. 25, 2017, 9 pages.
Partial English Translation and Abstract of Chinese Patent Application No. CN102466745, Oct. 24, 2015, 7 pages.
Partial English Translation and Abstract of Chinese Patent Application No. CN102572120, Sep. 17, 2015, 3 pages.
Partial English Translation and Abstract of Chinese Patent Application No. CN001764184, Part 1, Jul. 15, 2015, 5 pages.
Partial English Translation and Abstract of Chinese Patent Application No. CN001764184, Part 2, Jul. 15, 2015, 3 pages.
Foreign Communication From a Counterpart Application, PCT Application No. PCT/CN2014/079118, English Translation of International Search Report dated Sep. 2, 2014, 2 pages.
Foreign Communication From a Counterpart Application, PCT Application No. PCT/CN2014/079118, Written Opinion dated Sep. 2, 2014, 5 pages.
"Part 11: Wireless LAN Medium Access Control (MAC) and Physical Layer (PHY) Specifications," IEEE Computer Society, IEEE Std 802.11, Part 1, Mar. 29, 2012, 1446 pages.
"Part 11: Wireless LAN Medium Access Control (MAC) and Physical Layer (PHY) Specifications," IEEE Computer Society, IEEE Std 802.11, Part 2, Mar. 29, 2012, 1347 pages.
Bross, B., et al., "High Efficiency Video Coding (HEVC) text specification draft 10 (for FDIS & Last Call)," JCTVC-L1003_v34, 12th Meeting, Geneva, CH, Jan. 14-23, 2013, 310 pages.
"Series H: Audiovisual and Multimedia Systems, Infrastructure of audiovisual services—Coding of moving video, Advanced video coding for generic audiovisual services," ITU-T, H.264, Mar. 2009, 670 pages.
"Series H: Audiovisual and Multimedia Systems, Infrastructure of audiovisual services—Coding of moving video, High efficiency video coding," ITU-T, H.265, Apr. 2013, 317 pages.
"Wi-Fi Display, Technical Specification, Version 1.0.0," WiFi Alliance, Aug. 24, 2012, 149 pages.
Wikipedia, "High Efficiency Video Coding," XP055463902, May 6, 2013, 20 pages.
"H.264/MPEG-4 AVC," XP055463905, Apr. 25, 2013, 14 pages.
Foreign Communication From a Counterpart Application, European Application No. 14807574.0, European Result of Consultation dated Apr. 3, 2018, 5 pages.

* cited by examiner

CODING MANNER SWITCHING METHOD, TRANSMIT END, AND RECEIVE END

CROSS-REFERENCE TO RELATED APPLICATIONS

This application is a continuation of International Application No. PCT/CN2014/079118, filed on Jun. 4, 2014, which claims priority to Chinese Patent Application No. 201310221059.9, filed on Jun. 5, 2013, both of which are hereby incorporated by reference in their entireties.

TECHNICAL FIELD

The present invention relates to the field of communications, and in particular, to a coding manner switching method, a transmit end, and a receive end.

BACKGROUND

The Wireless Fidelity (Wi-Fi) Display 2.0 project of the Wi-Fi Alliance (WFA) has started, and currently, a video format standard used by the Wi-Fi Display 2.0 project is H.264/Moving Picture Experts Group-4 (MPEG-4) Advanced Video Coding (AVC). The H.265/High Efficiency Video Coding (HEVC) video format standard is a successor to H.264, and a highest resolution of H.265 may reach 8192×4320. In an actual application, in the case of same video picture quality, compared with that of H.264, a bit rate of H.265 decreases by 50 percent (%), a compression rate of H.265 is twice that of H.264, and coding efficiency of H.265 is higher. However, coding calculation complexity of H.265 is five times that of H.264, and complexity of a decoding algorithm at a decoding end is twice to thrice that of H.264, thereby greatly increasing power consumption of an encoder and a decoder, and increasing a burden on a central processing unit (CPU).

SUMMARY

Embodiments of the present invention provide a coding manner switching method, a transmit end, and a receive end, which can improve user experience during switching between HEVC and AVC.

To achieve the foregoing objective the embodiments of the present invention use the following technical solutions.

According to a first aspect, a coding manner switching method is provided, where the method includes acquiring, by a transmit end, state information of the transmit end and/or a receive end, where the state information includes at least one of CPU usage, a network bandwidth, and electricity amount information that are of the transmit end and/or the receive end, and information about media content to be sent by the transmit end; determining, by the transmit end, whether at least one piece of information among the state information meets a preset condition; and switching a coding manner of the media content if one piece of information among the state information meets the preset condition; and notifying, by the transmit end, the receive end of the coding manner of the media content of the transmit end, so that the receive end determines a decoding manner of the media content according to the coding manner of the media content.

With reference to the first aspect, in a first possible implementation manner of the first aspect, the information about the media content to be sent is a size of the media content to be sent by the transmit end, and/or a resolution of the media content to be sent by the transmit end, and/or a frame rate of the media content to be sent by the transmit end; and the coding manner is AVC H.264 or HEVC H.265.

With reference to the first aspect or the first possible implementation manner of the first aspect, in a second possible implementation manner of the first aspect, if the state information currently determined by the transmit end is the CPU usage, the preset condition is that the CPU usage of the transmit end and/or the CPU usage of the receive end is greater than a first preset threshold; and the switching the coding manner of the media content if one piece of information among the state information meets the preset condition includes, if the CPU usage of the transmit end and/or the CPU usage of the receive end is greater than the first preset threshold, switching, by the transmit end, the HEVC to the AVC.

With reference to the first aspect or the first possible implementation manner of the first aspect, in a third possible implementation manner of the first aspect, if the state information currently determined by the transmit end is the network bandwidth, the preset condition is that the network bandwidth is less than a second preset threshold; and the switching the coding manner of the media content if one piece of information among the state information meets the preset condition includes, if the network bandwidth of the transmit end and/or the network bandwidth of the receive end is less than the second preset threshold, switching, by the transmit end, the AVC to the HEVC.

With reference to the first aspect or the first possible implementation manner of the first aspect, in a fourth possible implementation manner of the first aspect, if the state information currently determined by the transmit end is the electricity amount information, the preset condition is that when the transmit end and/or the receive end is not connected to a power source, a remaining capacity of the transmit end and/or the receive end is less than a third preset threshold, where the third preset threshold is an electricity amount required by the transmit end and/or the receive end to complete playing unplayed media content of the media content; and the switching the coding manner of the media content if one piece of information among the state information meets the preset condition includes, if the remaining capacity of the transmit end and/or the receive end is less than the third preset threshold, switching, by the transmit end, the HEVC to the AVC.

With reference to the first aspect or the first possible implementation manner of the first aspect, in a fifth possible implementation manner of the first aspect, if the state information currently determined by the transmit end is the information about the media content to be sent by the transmit end, the preset condition is that the size and/or the resolution and/or the frame rate of the media content to be sent by the transmit end is greater than a fourth preset threshold; and the switching the coding manner of the media content if one piece of information among the state information meets the preset condition includes, if the size and/or the resolution and/or the frame rate of the media content to be sent by the transmit end is greater than the fourth preset threshold, switching, by the transmit end, the AVC to the HEVC.

With reference to the first aspect or the first possible implementation manner of the first aspect, in a sixth possible implementation manner of the first aspect, if there are at least two pieces of information among the state information, the transmit end determines whether at least one piece of information among the state information meets the preset condition; and switches the coding manner of the media content if one piece of information among the state information meets the preset condition; or the transmit end performs weighting on the state information according to weight values of the state information to acquire a weighting result; and the transmit end compares the weighting result with a fifth preset threshold; and if the weighting result is less than the fifth preset threshold, the transmit end switches the AVC to the HEVC.

With reference to any one of the first to the sixth possible implementation manners of the first aspect, in a seventh possible implementation manner of the first aspect, the notifying, by the transmit end, the receive end of the coding manner of the media content of the transmit end, so that the receive end determines the decoding manner of the media content according to the coding manner of the media content includes sending, by the transmit end, a notification message to the receive end, where the notification message carries an identifier of the coding manner of the media content obtained after the switching, and a serial number of an initial data packet for which the coding manner of the media content needs to be switched, or information about a location in which the coding manner of the media content needs to be switched, so that the receive end determines the decoding manner of the media content according to the notification message; or sending, by the transmit end to the receive end, an identifier of the coding manner of the media content obtained after the switching, where the identifier is carried in a data packet of the media content, so that the receive end determines the decoding manner of the media content according to the identifier of the coding manner.

According to a second aspect, a coding manner switching method is provided, where the method includes acquiring, by a receive end, state information of a transmit end and/or the receive end, where the state information includes at least one of CPU usage, a network bandwidth, and electricity amount information that are of the transmit end and/or the receive end, and information about media content to be sent by the transmit end; determining, by the receive end, whether at least one piece of information among the state information meets a preset condition; and sending a switching request message to the transmit end if one piece of information among the state information meets the preset condition, so that the transmit end switches a coding manner of the media content according to the switching request message; and determining, by the receive end, a decoding manner of the media content according to the coding manner of the media content notified by the transmit end.

With reference to the second aspect, in a first possible implementation manner of the second aspect, the information about the media content to be sent is a size of the media content to be sent by the transmit end, and/or a resolution of the media content to be sent by the transmit end, and/or a frame rate of the media content to be sent by the transmit end; and the coding manner is AVC H.264 or HEVC H.265.

With reference to the second aspect or the first possible implementation manner of the second aspect, in a second possible implementation manner of the second aspect, if the state information currently determined by the receive end is the CPU usage, the preset condition is that the CPU usage of the transmit end and/or the CPU usage of the receive end is greater than a first preset threshold; and the sending the switching request message to the transmit end if one piece of information among the state information meets the preset condition includes, if the CPU usage of the transmit end and/or the CPU usage of the receive end is greater than the first preset threshold, sending, by the receive end, the switching request message to the transmit end, so that the transmit end switches the HEVC to the AVC according to the switching request message.

With reference to the second aspect or the first possible implementation manner of the second aspect, in a third possible implementation manner of the second aspect, if the state information currently determined by the receive end is the network bandwidth, the preset condition is that the network bandwidth is less than a second preset threshold; and the sending the switching request message to the transmit end if one piece of information among the state information meets the preset condition includes, if the network bandwidth of the transmit end and/or the network bandwidth of the receive end is less than the second preset threshold, sending, by the receive end, the switching request message to the transmit end, so that the transmit end switches the AVC to the HEVC according to the switching request message.

With reference to the second aspect or the first possible implementation manner of the second aspect, in a fourth possible implementation manner of the second aspect, if the state information currently determined by the receive end is the electricity amount information, the preset condition is that when the transmit end and/or the receive end is not connected to a power source, a remaining capacity of the transmit end and/or the receive end is less than a third preset threshold, where the third preset threshold is an electricity amount required by the transmit end and/or the receive end to complete playing unplayed media content of the media content; and the sending the switching request message to the transmit end if one piece of information among the state information meets the preset condition includes, if the remaining capacity of the transmit end and/or the receive end is less than the third preset threshold, sending, by the receive end, the switching request message to the transmit end, so that the transmit end switches the HEVC to the AVC according to the switching request message.

With reference to the second aspect or the first possible implementation manner of the second aspect, in a fifth possible implementation manner of the second aspect, if the state information currently determined by the receive end is the information about the media content to be sent by the transmit end, the preset condition is that the size and/or the resolution and/or the frame rate of the media content to be sent by the transmit end is greater than a fourth preset threshold; and the sending the switching request message to the transmit end if one piece of information among the state information meets the preset condition includes, if the size and/or the resolution and/or the frame rate of the media content to be sent by the transmit end is greater than the fourth preset threshold, sending, by the receive end, the switching request message to the transmit end, so that the transmit end switches the AVC to the HEVC according to the switching request message.

With reference to the second aspect or the first possible implementation manner of the second aspect, in a sixth possible implementation manner of the second aspect, if there are at least two pieces of information among the state information, the receive end determines whether at least one piece of information among the state information meets the preset condition, and sends the switching request message to the transmit end if one piece of information among the state information meets the preset condition, so that the transmit end switches the coding manner of the media content according to the switching request message; or the receive end performs weighting on the state information according to weight values of the state information to acquire a weighting result; and the receive end compares the weighting result with a fifth preset threshold; and if the weighting result is less than the fifth preset threshold, the receive end sends the switching request message to the transmit end, so that the transmit end switches the AVC to the HEVC according to the switching request message.

With reference to any one of the second to the sixth possible implementation manners of the second aspect, in a seventh possible implementation manner of the second aspect, the determining, by the receive end, a decoding manner of the media content according to the coding manner of the media content notified by the transmit end includes receiving, by the receive end, a notification message sent by the transmit end, where the notification message carries an identifier of the coding manner of the media content obtained after the switching by the transmit end, and a serial number of an initial data packet for which the coding manner of the media content needs to be switched, or information about a location in which the coding manner of the media content needs to be switched, so that the receive end determines the decoding manner of the media content according to the notification message; or when the receive end receives the media content sent by the transmit end, determining, by the receive end, the decoding manner of the media content according to an identifier of the coding manner of the media content obtained after the switching, where the identifier is carried in a data packet of the media content.

According to a third aspect, a transmit end is provided, where the transmit end includes an acquisition unit configured to acquire, state information of the transmit end and/or a receive end, where the state information includes at least one of CPU usage, a network bandwidth, and electricity amount information that are of the transmit end and/or the receive end, and information about media content to be sent by the transmit end; a processing unit configured to determine, by the transmit end, whether at least one piece of information among the state information meets a preset condition, and switch a data coding manner of the media content if one piece of information among the state information meets the preset condition; and a sending unit, further configured to notify, the receive end of the coding manner of the transmit end, so that the receive end determines a decoding manner of the media content according to the coding manner of the media content.

With reference to the third aspect, in a first possible implementation manner of the third aspect, the information about the media content to be sent is a size of the media content to be sent by the transmit end, and/or a resolution of the media content to be sent by the transmit end, and/or a frame rate of the media content to be sent by the transmit end; and the coding manner is AVC H.264 or HEVC H.265.

With reference to the third aspect or the first possible implementation manner of the third aspect, in a second possible implementation manner of the third aspect, the processing unit is configured to, if the state information currently determined by the transmit end is the CPU usage, the preset condition is that the CPU usage of the transmit end and/or the CPU usage of the receive end is greater than a first preset threshold; and if the CPU usage of the transmit end and/or the CPU usage of the receive end is greater than the first preset threshold, the processing unit switches the HEVC to the AVC.

With reference to the third aspect or the first possible implementation manner of the third aspect, in a third possible implementation manner of the third aspect, the processing unit is configured to, if the state information currently determined by the transmit end is the network bandwidth, the preset condition is that the network bandwidth is less than a second preset threshold; and the processing unit is configured to, if the network bandwidth of the transmit end and/or the network bandwidth of the receive end is less than the second preset threshold, switch the AVC to the HEVC.

With reference to the third aspect or the first possible implementation manner of the third aspect, in a fourth possible implementation manner of the third aspect, the processing unit is configured to, if the state information currently determined by the transmit end is the electricity amount information, the preset condition is that when the transmit end and/or the receive end is not connected to a power source, a remaining capacity of the transmit end and/or the receive end is less than a third preset threshold, where the third preset threshold is an electricity amount required by the transmit end and/or the receive end to complete playing unplayed media content of the media content; and the processing unit is configured to, if the remaining capacity of the transmit end and/or the receive end is less than the third preset threshold, switch the HEVC to the AVC.

With reference to the third aspect or the first possible implementation manner of the third aspect, in a fifth possible implementation manner of the third aspect, the processing unit is configured to, if the state information currently determined by the transmit end is the information about the media content to be sent by the transmit end, the preset condition is that the size and/or the resolution and/or the frame rate of the media content to be sent by the transmit end is greater than a fourth preset threshold; and the processing unit is configured to, if the size and/or the resolution and/or the frame rate of the media content to be sent by the transmit end is greater than the fourth preset threshold, switch the AVC to the HEVC.

With reference to the third aspect or the first possible implementation manner of the third aspect, in a sixth possible implementation manner of the third aspect, if there are at least two pieces of information among the state information, the processing unit determines whether at least one piece of information among the state information meets the preset condition, and switches the coding manner of the media content if one piece of information among the state information meets the preset condition; or the processing unit performs weighting on the state information according to weight values of the state information to acquire a weighting result; and the processing unit compares the weighting result with a fifth preset threshold; and if the weighting result is less than the fifth preset threshold, the transmit end switches the AVC to the HEVC.

With reference to the third aspect or the first possible implementation manner to the sixth possible implementation manner of the third aspect, in a seventh possible implementation manner of the third aspect, the sending unit is configured to send a notification message to the receive end, where the notification message carries an identifier of the coding manner of the media content obtained after the switching, and a serial number of an initial data packet for which the coding manner of the media content needs to be switched, or information about a location in which the coding manner of the media content needs to be switched, so that the receive end determines the decoding manner of the media content according to the notification message; or send, by the transmit end to the receive end, an identifier of the coding manner of the media content obtained after the switching, where the identifier is carried in a data packet of the media content, so that the receive end determines the decoding manner of the media content according to the identifier of the coding manner.

According to a fourth aspect, a receive end is provided, where the receive end includes an acquisition unit configured to acquire, state information of a transmit end and/or the receive end, where the state information includes at least one of CPU usage, a network bandwidth, and electricity amount information that are of the transmit end and/or the receive end, and information about media content to be sent by the transmit end; and a processing unit configured to determine whether at least one piece of information among the state information meets a preset condition, and send a switching request message to the transmit end if one piece of information among the state information meets the preset condition, so that the transmit end switches a coding manner of the media content according to the switching request message, where the processing unit is further configured to determine a decoding manner of the media content according to the coding manner of the media content notified by the transmit end.

With reference to the fourth aspect, in a first possible implementation manner of the fourth aspect, the information about the media content to be sent is a size of the media content to be sent by the transmit end, and/or a resolution of the media content to be sent by the transmit end, and/or a frame rate of the media content to be sent by the transmit end; and the coding manner is AVC H.264 or HEVC H.265.

With reference to the fourth aspect or the first possible implementation manner of the fourth aspect, in a second possible implementation manner of the fourth aspect, if the state information currently determined by the receive end is the CPU usage, the preset condition is that the CPU usage of the transmit end and/or the CPU usage of the receive end is greater than a first preset threshold; and the processing unit is configured to, if the CPU usage of the transmit end and/or the CPU usage of the receive end is greater than the first preset threshold, send the switching request message to the transmit end, so that the transmit end switches the HEVC to the AVC according to the switching request message.

With reference to the fourth aspect or the first possible implementation manner of the fourth aspect, in a third possible implementation manner of the fourth aspect, if the state information currently determined by the receive end is the network bandwidth, the preset condition is that the network bandwidth is less than a second preset threshold; and the processing unit is configured to, if the network bandwidth of the transmit end and/or the network bandwidth of the receive end is less than the second preset threshold, send the switching request message to the transmit end, so that the transmit end switches the AVC to the HEVC according to the switching request message.

With reference to the fourth aspect or the first possible implementation manner of the fourth aspect, in a fourth possible implementation manner of the fourth aspect, if the state information currently determined by the receive end is the electricity amount information, the preset condition is that when the transmit end and/or the receive end is not connected to a power source, a remaining capacity of the transmit end and/or the receive end is less than a third preset threshold, where the third preset threshold is an electricity amount required by the transmit end and/or the receive end to complete playing unplayed media content of the media content; and the processing unit is configured to, if the remaining capacity of the transmit end and/or the receive end is less than the third preset threshold, send the switching request message to the transmit end, so that the transmit end switches the HEVC to the AVC according to the switching request message.

With reference to the fourth aspect or the first possible implementation manner of the fourth aspect, in a fifth possible implementation manner of the fourth aspect, if the state information currently determined by the receive end is the information about the media content to be sent by the transmit end, the preset condition is that the size and/or the resolution and/or the frame rate of the media content to be sent by the transmit end is greater than a fourth preset threshold; and the processing unit is configured to, if the size and/or the resolution and/or the frame rate of the media content to be sent by the transmit end is greater than the fourth preset threshold, send the switching request message to the transmit end, so that the transmit end switches the AVC to the HEVC according to the switching request message.

With reference to the fourth aspect or the second possible implementation manner of the fourth aspect, in a sixth possible implementation manner of the fourth aspect, if there are at least two pieces of information among the state information, the processing unit determines whether at least one piece of information among the state information meets the preset condition, and sends the switching request message to the transmit end if one piece of information among the state information meets the preset condition, so that the transmit end switches the coding manner of the media content according to the switching request message; or the processing unit performs weighting on the state information according to weight values of the state information to acquire a weighting result; and the processing unit compares the weighting result with a fifth preset threshold; and if the weighting result is less than the fifth preset threshold, the receive end sends the switching request message to the transmit end, so that the transmit end switches the AVC to the HEVC according to the switching request message.

With reference to the fourth aspect or the first possible implementation manner to the sixth possible implementation manner of the fourth aspect, in a seventh possible implementation manner of the fourth aspect, a receiving unit receives a notification message sent by the transmit end, where the notification message carries an identifier of the coding manner of the media content obtained after the switching by the transmit end, and a serial number of an initial data packet for which the coding manner of the media content needs to be switched, or information about a location in which the coding manner of the media content needs to be switched, so that the processing unit determines the decoding manner of the media content according to the notification message; or when the receiving unit receives the media content sent by the transmit end, the processing unit determines the decoding manner of the media content according to an identifier of the coding manner of the media content obtained after the switching, where the identifier is carried in a data packet of the media content.

The embodiments of the present invention provide a coding manner switching method, a transmit end, and a receive end, where state information of the transmit end and/or the receive end is acquired, where the state information includes at least one of CPU usage, a network bandwidth, and electricity amount information that are of the transmit end and/or the receive end, and information about media content to be sent by the transmit end; it is determined whether at least one piece of information among the state information meets a preset condition, and a coding manner of the media content is switched if one piece of information among the state information meets the preset condition; and the receive end is notified of the coding manner of the media content of the transmit end, so that the receive end determines a decoding manner of the media content according to the coding manner of the media content. In this way, user experience can be improved as the coding manner of the media content is switched.

BRIEF DESCRIPTION OF THE DRAWINGS

To describe the technical solutions in the embodiments of the present invention more clearly, the following briefly introduces the accompanying drawings required for describing the embodiments. The accompanying drawings in the following description show merely some embodiments of the present invention, and a person of ordinary skill in the art may still derive other drawings from these accompanying drawings without creative efforts.

DETAILED DESCRIPTION

The following clearly describes the technical solutions in the embodiments of the present invention with reference to the accompanying drawings in the embodiments of the present invention. The described embodiments are merely some but not all of the embodiments of the present invention. All other embodiments obtained by a person of ordinary skill in the art based on the embodiments of the present invention without creative efforts shall fall within the protection scope of the present invention.

Figure 1:
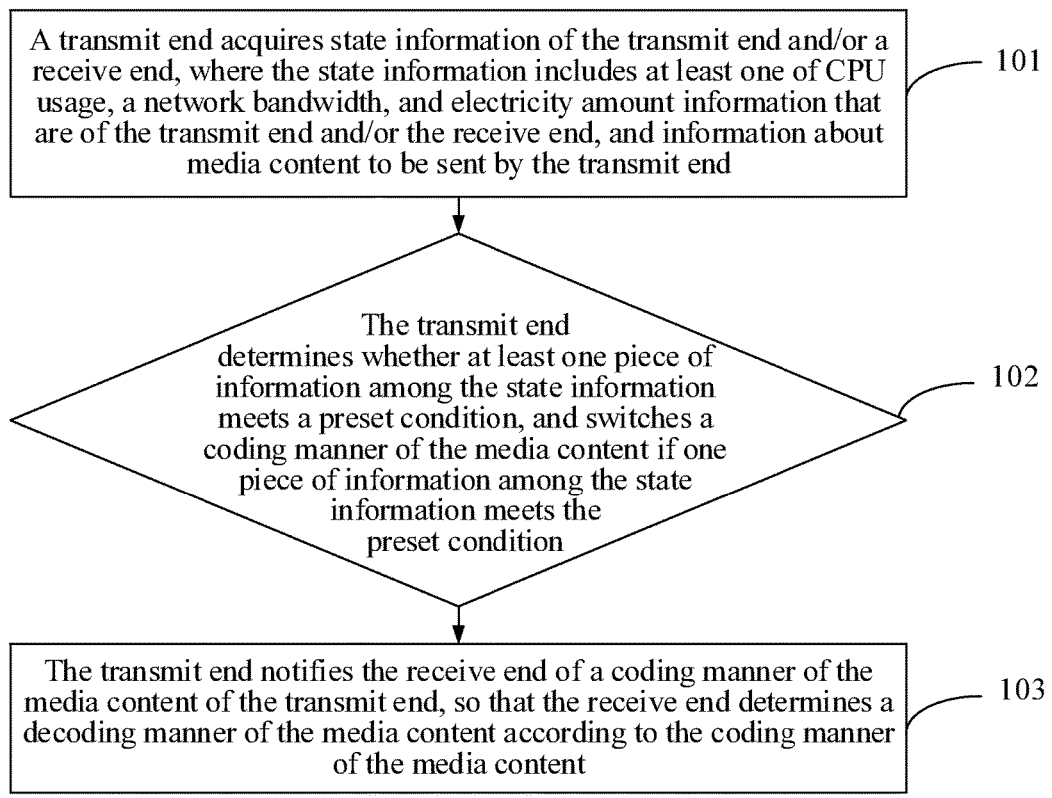
FIG. 1 is a schematic flowchart of a coding manner switching method according to an embodiment of the present invention.

An embodiment of the present invention provides a coding manner switching method, which, as shown in FIG. 1, includes the following steps.

101: A transmit end acquires state information of the transmit end and/or a receive end, where the state information includes at least one of CPU usage, a network bandwidth, and electricity amount information that are of the transmit end and/or the receive end, and information about media content to be sent by the transmit end.

Exemplarily, the Source end (transmit end) and the Sink end (receive end) herein may be terminals that can use a Wi-Fi technology and have display screen. For example, the Source end may be a mobile phone, and the Sink end may be a Television (TV) or the like.

Before the Source end acquires the state information of the Sink end, the Source end may implement device discovery and service discovery by means of Wi-Fi Direct or a Universal Plug and Play (UPnP) Simple Service Discovery Protocol (SSDP). If the Source end implements device discovery by means of the Wi-Fi Direct, the Source end establishes a connection to the Sink end by means of the Wi-Fi Direct or Tunneled Direct Link Setup (TDLS); if the Source end implements device discovery by means of the UPnP SSDP, the Source end establishes a Transmission Control Protocol (TCP) connection to the Sink end.

Then, the Source end and the Sink end perform capability negotiation, and may determine whether the Source end and the Sink end have a same capability by sending a notification message to each other. For example, the notification message may include a data resolution, a video format, a data coding manner, a data decoding manner, and the like of a terminal. When the Source end and the Sink end have a same capability, the Source end sends a request message to the Sink end, so that the Sink end initiates a Real Time Streaming Protocol (RTSP) session request to the Source end according to the request message, so that the Source end sends a response message to the Sink end, where the response message carries a Uniform Resource Locator (URL) parameter.

After the Source end and the Sink end establish an RTSP session, the Sink end sends a playback request message to the Source end, and the Source end sends a response message to the Sink end according to the playback request message, so that the Source end transmits a video data packet to the Sink end.

102: The transmit end determines whether at least one piece of information among the state information meets a preset condition, and switches a coding manner of the media content if one piece of information among the state information meets the preset condition.

The data coding manner is H.264/AVC or H.265/HEVC.

Exemplarily, if there is one piece of state information, the Source end may determine whether one piece of information among the state information meets the preset condition, and switch the coding manner of the media content if one piece of information among the state information meets the preset condition.

Alternatively, if there are at least two pieces of state information, the Source end determines whether at least one piece of information among the state information meets the preset condition, and switches the coding manner of the media content if one piece of information among the state information meets the preset condition.

Alternatively, if there are at least two pieces of state information, the Source end performs weighting on the state information according to weight values of the state information to acquire a weighting result, and compares the weighting result with a fifth preset threshold; and if the weighting result is less than the fifth preset threshold, the receive end sends a switching request message to the transmit end, so that the transmit end switches the AVC to the HEVC according to the switching request message.

103: The transmit end notifies the receive end of the coding manner of the media content of the transmit end, so that the receive end determines a decoding manner of the media content according to the coding manner of the media content.

Exemplarily, the transmit end sends a notification message to the receive end, where the notification message carries an identifier of the coding manner of the media content obtained after the switching, and a serial number of an initial data packet for which the coding manner of the media content needs to be switched, or information about a location in which the coding manner of the media content needs to be switched, so that the receive end determines the decoding manner of the media content according to the notification message, where the location information may be information about a time, for example, minute information, at which the coding manner needs to be switched, or byte information of the initial data packet for which the coding manner needs to be switched.

Alternatively, the transmit end sends, to the receive end, an identifier of the coding manner of the media content obtained after the switching, where the identifier is carried in a data packet of the media content, so that the receive end acquires the decoding manner of the media content according to the identifier of the coding manner.

This embodiment of the present invention provides a coding manner switching method, where a transmit end acquires state information of the transmit end and a receive end, where the state information includes at least one of CPU usage, a network bandwidth, and electricity amount information that are of the transmit end and/or the receive end, and information about media content to be sent by the transmit end; and determines whether at least one piece of information among the state information meets a preset condition, and switches a coding manner of the media content if one piece of information among the state information meets the preset condition; and the transmit end notifies the receive end of a coding manner of the media content of the transmit end, so that the receive end determines a decoding manner of the media content according to the coding manner of the media content. In this way, user experience can be improved as the coding manner of the media content is switched.

Figure 2:
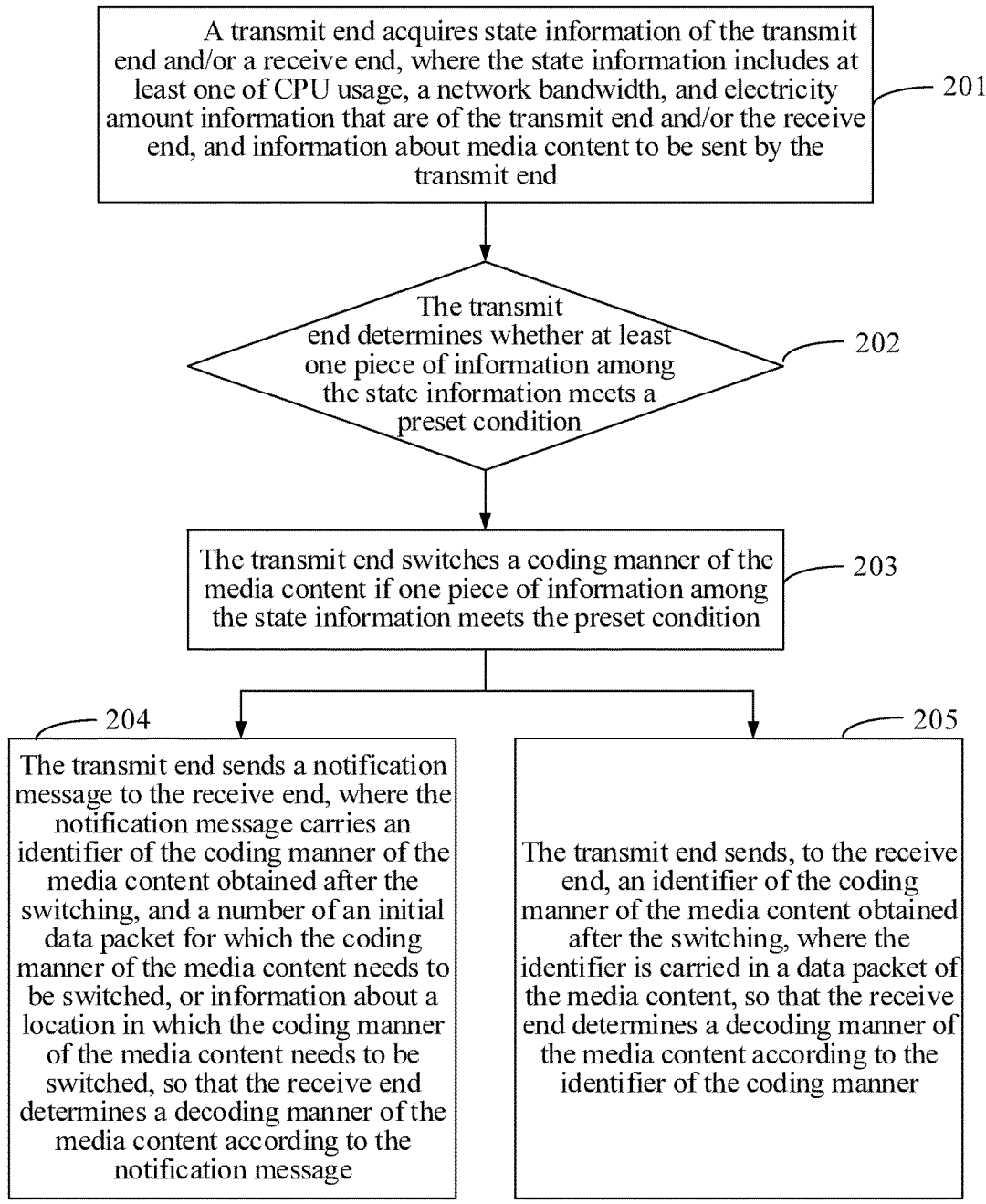
FIG. 2 is a schematic flowchart of a coding manner switching method according to another embodiment of the present invention.

As shown in FIG. 2, another embodiment of the present invention provides a coding manner switching method.

201: A transmit end acquires state information of the transmit end and/or a receive end, where the state information includes at least one of CPU usage, a network bandwidth, and electricity amount information that are of the transmit end and/or the receive end, and information about media content to be sent by the transmit end.

Exemplarily, the Source end (transmit end) and the Sink end (receive end) herein may be terminals that can use a Wi-Fi technology and have display screen. For example, the Source end may be a mobile phone, and the Sink end may be a TV or the like.

Before the Source end acquires the state information of the Source end and/or the Sink end, the Source end may implement device discovery and service discovery by means of Wi-Fi Direct or a UPnP SSDP. If the Source end implements device discovery by means of the Wi-Fi Direct, the Source end establishes a connection to the Sink end by means of the Wi-Fi Direct or TDLS; if the Source end implements device discovery by means of the UPnP SSDP, the Source end establishes a TCP connection to the Sink end.

Then, the Source end and the Sink end perform capability negotiation, and may determine whether the Source end and the Sink end have a same capability by sending a notification message to each other. For example, the notification message may include a data resolution, a video format, a data coding manner, a data decoding manner, and the like of a terminal. When the Source end and the Sink end have a same capability, the Source end sends a request message to the Sink end, so that the Sink end initiates an RTSP Session request to the transmit end according to the request message, so that the Source end sends a response message to the Sink end, where the response message carries a URL parameter.

After the Source end and the Sink end establish an RTSP session, the Sink end sends a playback request message to the Source end; and the Source end sends a response message to the Sink end after the Source end receives the playback request message of the Sink end, and then the Source end starts to send a video data packet to the Sink end and starts to transmit a media stream to the Sink end.

Then, the Source end may acquire the state information of the Source end in real time, where the state information of the Source end may include at least one of the CPU usage situation, the network bandwidth information, and the electricity amount information that are of the Source end, and the information about the media content to be sent by the Source end, or the Source end may acquire, in real time by using an RTSP GET_PARAMETER ( ) method, at least one of the CPU usage situation, the network bandwidth, and the electricity amount information that are of the Sink end, and the information about the media content to be sent by the Source end; or the Source end may acquire in real time at least one of the CPU usage situations, the network bandwidths, and the electricity amount information that are of the Source end and the Sink end, and the information about the media content to be sent by the Source end, where a Profile of the information about the media content is a size of the media content to be sent by the Source end and/or a resolution of the media content to be sent by the Source end and/or a frame rate of the media content to be sent by the Source end.

202: The transmit end determines whether at least one piece of information among the state information meets a preset condition.

Exemplarily, three pieces of information among the state information may not be considered. If there is one piece of state information, the transmit end only determines whether one piece of information among the state information meets the preset condition, and switches a coding manner of the media content if one piece of information among the state information meets the preset condition. For example, in a case in which the network bandwidths, the electricity amount information of the transmit end and the receive end, and the information about the media content to be sent by the transmit end are not considered, it is determined whether the CPU usage of the Source end and/or the CPU usage of the Sink end meets the preset condition by determining the CPU usage of the Source end and/or the CPU usage of the Sink end.

Alternatively, two pieces of information among the state information may not be considered. If there are two pieces of state information, the transmit end determines whether the remaining two pieces of state information among the state information meet the preset condition, and switches a coding manner of the media content if one piece of information among the state information meets the preset condition. For example, the electricity amount information of the transmit end and the receive end, and a resolution of media content to be coded by the transmit end are not considered; it is determined whether the CPU usage and the network bandwidth that are of the transmit end and/or the receive end meet the preset condition, where a sequence of determining the CPU usage and the network bandwidth that are of the transmit end and/or the receive end is not limited herein; and the coding manner of the media content is switched if one piece of information among the state information meets the preset condition.

Alternatively, one piece of information among the state information may not be considered. If there are three pieces of state information, the transmit end determines whether the remaining three pieces of state information among the state information meet the preset condition, and switches a coding manner of the media content if one piece of information among the state information meets the preset condition. For example, a resolution of media content to be coded by the transmit end is not considered; it is determined whether the CPU usage, the network bandwidth, and the electricity amount information that are of the transmit end and/or the receive end among the state information meet the preset condition, where a sequence of determining the CPU usage, the network bandwidth, and the electricity amount information that are of the transmit end and/or the receive end is not limited herein; and the coding manner of the media content is switched if one piece of information among the state information meets the preset condition.

Alternatively, if there are four pieces of state information, the transmit end may determine whether the four pieces of state information among the state information meet the preset condition, and switch a coding manner of the media content if one piece of information among the state information meets the preset condition. A sequence of determining the CPU usage, the network bandwidth, and the electricity amount information that are of the transmit end and/or the receive end, and the information about the media content to be sent by the transmit end is not limited herein; and the coding manner of the media content is switched if one piece of information among the state information meets the preset condition.

The data coding manner may include H.264/AVC or H.265/HEVC.

203: The transmit end switches a coding manner of the media content if one piece of information among the state information meets the preset condition.

Exemplarily, three pieces of information among the state information may not be considered; it is determined whether one piece of information among the state information meets the preset condition, and the coding manner of the media content is switched if one piece of information among the state information meets the preset condition.

Optionally, in a case in which the network bandwidths, the electricity amount information of the transmit end and the receive end, and the information about the media content to be sent by the transmit end are not considered, when the CPU usage of the Source end and/or the CPU usage of the Sink end is determined, the preset condition is that the CPU usage of the Source end and/or the CPU usage of the Sink end is greater than a first preset threshold. When state information currently determined by the Source end is the CPU usage of the Source end, if the CPU usage of the Source end is less than or equal to the first preset threshold, the data coding manner may be the HEVC, that is, the H.265 coding manner, or the AVC, that is, the H.264 coding manner. When state information currently determined by the Source end is the CPU usage of the Sink end, if the CPU usage of the Sink end is less than or equal to the first preset threshold, the data coding manner may be the HEVC or the AVC. When state information currently determined by the Source end is the CPU usage of the Source end and the CPU usage of the Sink end, if the CPU usage of the Source end and the CPU usage of the Sink end are less than or equal to the first preset threshold, the data coding manner may be the HEVC or the AVC. When a current coding manner of the transmit end is the HEVC, if the CPU usage of the Source end and/or the usage of the Sink end is greater than the first preset threshold, the HEVC H.265 is switched to the AVC H.264. That is, in a case in which the CPU usage of the Source end and/or the CPU usage of the Sink end is low, the Source end codes the media content according to the H.265 coding manner; if the CPU usage of either or both of the Source end and the Sink end is greater than the first preset threshold, the H.265 coding manner is switched to the H.264 coding manner to code the media content. The first preset threshold may be 50% or the like, or another value, which is not limited herein.

Optionally, in a case in which the CPU usage of the transmit end and the receive end, the electricity amount information of the transmit end and the receive end, and the information about the media content to be sent by the transmit end are not considered, when the network bandwidth of the transmit end and/or the receive end among the state information is determined, the preset condition is that the network bandwidth is less than a second preset threshold. If the network bandwidth of the transmit end and/or the network bandwidth of the receive end is less than the second preset threshold, the transmit end switches the AVC to the HEVC. When state information currently determined by the transmit end is the network bandwidth of the transmit end, if the network bandwidth of the transmit end is greater than or equal to the second preset threshold, the coding manner of the media content of the transmit end may be the HEVC or the AVC. When state information currently determined by the transmit end is the network bandwidth of the receive end, if the network bandwidth of the receive end is greater than or equal to the second preset threshold, the coding manner of the media content of the transmit end may be the HEVC or the AVC. When state information currently determined by the transmit end is the network bandwidths of the transmit end and the receive end, if the network bandwidths of the transmit end and the receive end are greater than or equal to the second preset threshold, the coding manner of the media content of the transmit end may be the HEVC or the AVC. The second preset threshold may be 8 Megabits per second (Mbit/s) or the like, or another value, which is not limited herein. For example, when a current bandwidth is less than 8 Mbit/s, that is, the current bandwidth is insufficient, the Source end codes the media content by means of the HEVC H.265; when the current bandwidth is greater than 8 Mbit/s, that is, the bandwidth is sufficient, the coding manner may be the HEVC or the AVC.

Optionally, in a case in which the CPU usage and the network bandwidth information that are of the transmit end and the receive end, and the information about the media content to be sent by the transmit end are not considered, when the electricity amount information of the transmit end and/or the receive end among the state information is determined, the preset condition is that when neither the transmit end nor the receive end is connected to a power source, a remaining capacity of the transmit end and/or the receive end is less than a third preset threshold, where the third preset threshold is an electricity amount required by the transmit end and/or the receive end to complete playing unplayed media content of the media content.

Exemplarily, when state information currently determined by the transmit end is the electricity amount information of the transmit end, if the remaining capacity of the transmit end is greater than or equal to the electricity amount required by unplayed media content of current media content, the coding manner of the media content may be the HEVC or the AVC. When state information currently determined by the transmit end is the electricity amount information of the receive end, if the remaining capacity of the receive end is greater than or equal to the electricity amount required by unplayed media content of current media content, the coding manner of the media content is the HEVC or the AVC. When a coding manner of current media content of the transmit end is the HEVC, and currently determined state information is the electricity amount information of the transmit end and the receive end, if the remaining capacities of the transmit end and the receive end are greater than or equal to the electricity amount required by unplayed media content of current media content, the coding manner is the HEVC or the AVC; if the remaining capacity of the transmit end and/or the receive end is less than the electricity amount required by unplayed media content of current media content, that is, less than a third preset threshold, the transmit end switches the HEVC to the AVC.

In a case in which neither the transmit end nor the receive end is connected to a power source, an electricity amount required to code a video data packet corresponding to the unplayed media content of the current media content, that is, duration required by the transmit end to complete playing the unplayed media content, may be acquired according to total playback duration of the current media content at the transmit end, and an electricity amount consumed by the transmit end in a unit time to code video data of the current media content; and an electricity amount required to decode the video data packet corresponding to the unplayed media content of the current media content, that is, duration required by the receive end to complete playing the unplayed media content, may be acquired according to total playback duration of the current media content at the receive end, and an electricity amount consumed by the receive end in a unit time to decode the video data of the current media content.

When the electricity amount information of the transmit end and/or the receive end meets the preset condition, when the remaining capacity of either of the transmit end and the receive end is insufficient, or the remaining capacities of both the transmit end and the receive end are insufficient, the HEVC is switched to the AVC.

Exemplarily, in a case in which the transmit end is not connected to a power source, if state information currently determined by the transmit end is the electricity amount information of the transmit end, and the remaining capacity of the transmit end is greater than or equal to the electricity amount required by the unplayed media content of the current media content, the coding manner is the HEVC or the AVC; if the remaining capacity of the transmit end is less than an electricity amount required to code the unplayed media content of the current media content and send the unplayed media content to the receive end, that is, less than the third preset threshold, the transmit end switches the HEVC to the AVC.

Optionally, in a case in which the CPU usage and the network bandwidth that are of the transmit end and the receive end, and the electricity amount information of the transmit end and the receive end are not considered, when the information about the media content to be sent by the transmit end is determined, the preset condition is that the size and/or the resolution and/or the frame rate of the media content to be sent by the transmit end is greater than a fourth preset threshold. If the information about the media content to be sent by the transmit end is less than or equal to the fourth preset threshold, the coding manner of the media content may be the HEVC or the AVC. When a coding manner of current media content of the transmit end is the AVC, if the size and/or the resolution and/or the frame rate of the media content to be sent by the transmit end is greater than the fourth preset threshold, the transmit end switches the AVC to the HEVC. The fourth preset threshold herein may be 4 k/8 k/3 D, or another value, which is not limited herein.

For example, when both the size of the media content to be sent and the resolution of the media content to be sent are considered, after the transmit end completes playing a piece of media content, if a media content size of a next piece of media content to be played is 3 billion (G) and does not reach 10 G, a preset threshold of a media content size, and a resolution reaches 8 thousand (K), the fourth preset threshold, the transmit end switches the AVC to the HEVC. Alternatively, when both the resolution and the frame rate of the media content to be sent are considered, if the resolution reaches 8 K, the fourth preset threshold, and the frame rate does not reach 60 frames per second (frames/s), the fourth preset threshold, the transmit end switches the AVC to the HEVC. Certainly, fourth preset thresholds of the size, the resolution, and the frame rate of the media content to be sent are different from each other.

Optionally, two pieces of information among the state information may not be considered. It is determined whether the remaining two pieces of information among the state information meet the preset condition, and the data coding manner is switched if one piece of information among the state information meets the preset condition. For example, the electricity amount information of the transmit end and the receive end, and the information about the media content to be sent by the transmit end are not considered; it is determined whether the CPU usage and the network bandwidth that are of the transmit end and/or the receive end meet the preset condition, where a sequence of determining the CPU usage and the network bandwidth information that are of the transmit end and/or the receive end is not limited herein; and the data coding manner is switched if one piece of information among the state information meets the preset condition.

Exemplarily, when the CPU usage and the network bandwidth that are of the transmit end and the receive end are determined, it is first determined whether the CPU usage of the transmit end and the receive end is greater than a preset threshold; if the CPU usage of the transmit end and the CPU usage of the receive end are less than or equal to a first preset threshold, and the coding manner of the media content is the HEVC or the AVC, the preset condition is not met; therefore, the coding manner of the media content is not switched. It is then determined whether the network bandwidth information is less than a second preset threshold; if the network bandwidth is less than the second preset threshold, which meets the preset condition, and a current coding manner is the AVC, the AVC is switched to the HEVC.

Optionally, one piece of information among the state information may not be considered. It is determined whether the remaining three pieces of information among the state information meet the preset condition, and the data coding manner is switched if one piece of information among the state information meets the preset condition.

Exemplarily, when the information about the media content to be sent by the transmit end is not considered, the state information of the transmit end and/or the receive end is determined, where the state information includes the CPU usage, the network bandwidth, and the electricity amount information that are of the transmit end and/or the receive end. A sequence of determining the three pieces of information among the state information is not limited herein. For example, it is first determined whether the CPU usage of the transmit end and the receive end is greater than a first preset threshold; if the CPU usage of the transmit end and the CPU usage of the receive end are less than or equal to the first preset threshold, and the coding manner of the media content is the HEVC or the AVC, the preset condition is not met; therefore, the coding manner is not switched. It is then determined whether the network bandwidth is greater than a second preset threshold; if the network bandwidth is greater than the second preset threshold, the preset condition is not met; therefore, the coding manner is not switched. Finally, it is determined whether a remaining capacity of the transmit end is less than an electricity amount required to code a video data packet corresponding to unplayed media content of current media content, and whether a remaining capacity of the receive end is less than an electricity amount required to decode the video data packet corresponding to the unplayed media content of the current media content; if the remaining capacity of the transmit end is less than the electricity amount required to code the video data packet corresponding to the unplayed media content of the current media content, and/or the remaining capacity of the receive end is greater than or equal to the electricity amount required to decode the video data packet corresponding to the unplayed media content of the current media content, and a current coding manner is the HEVC, the HEVC is switched to the AVC.

Optionally, four pieces of information among the state information may be considered together. It is determined whether the four pieces of information among the state information meet the preset condition; and the coding manner of the media content is switched if one piece of information among the state information meets the preset condition, where a determining process is similar to the method for determining whether three pieces of information among the state information meet the preset condition, and is not described herein again.

Optionally, if there are at least two pieces of state information, it may be determined whether at least one piece of information among the state information meets the preset condition, and the coding manner of the media content is switched if one piece of information among the state information meets the preset condition, which is similar to the foregoing determining method.

Alternatively, if there are at least two pieces of state information, the transmit end may perform weighting on the state information according to weight values of the state information to acquire a weighting result, and compare the weighting result with a fifth preset threshold; and if the weighting result is less than the fifth preset threshold, and a coding manner of current media content is the AVC, the transmit end switches the AVC to the HEVC.

Exemplarily, the CPU usage, the network bandwidth information, and the electricity amount information that are of the transmit end and/or the receive end, and the information about the media content to be sent by the transmit end may be considered together, that is, if there are four pieces of state information, the transmit end determines, according to weight values of the state information, whether the state information meets the preset condition, where the preset condition is that a current weight value of the state information is less than the fifth preset threshold. It may be set that the CPU usage, the network bandwidth, and the electricity amount information that are of the transmit end and/or the receive end, and the information about the media content to be sent by the transmit end account for different weights, and a standard weight value is acquired by using a weighting algorithm, where the standard weight value may be the fifth preset threshold. For example, the CPU usage accounts for 3.5, the network bandwidth accounts for 3.5, the electricity amount information accounts for 2.0, and the information about the media content to be sent by the transmit end accounts for 1.0. Then, weighting is performed on the CPU usage, the network bandwidth, and the electricity amount information that are of the transmit end and/or the receive end, and the information about the media content to be sent by the transmit end among the state information, to acquire the current weight value of the state information; and then the current weight value of the state information is compared with the fifth preset threshold.

When the current weight value of the state information is compared with the fifth preset threshold, if the current weight value of the state information is greater than or equal to the fifth preset threshold, the data coding manner is the HEVC or the AVC; if the current weight value of the state information is less than the fifth preset threshold, and a current coding manner of the transmit end is the AVC, the transmit end switches the AVC to the HEVC.

204: The transmit end sends a notification message to the receive end, where the notification message carries an identifier of the coding manner of the media content obtained after the switching, and a serial number of an initial data packet for which the coding manner of the media content needs to be switched, or information about a location in which the coding manner of the media content needs to be switched, so that the receive end determines a decoding manner of the media content according to the notification message.

Exemplarily, in the H.264 and H.265 coding manners, Video Coding Layer (VCL) data is encapsulated by using the Network Abstraction Layer (NAL), a video data packet encapsulated by using the NAL may be considered as a group of data, and one group has data greater than a frame of picture data. A data coding manner may be switched by using an NAL video data packet as a unit, and in this way, coding manners of pictures inside an NAL video data packet are consistent. Therefore, when the transmit end codes a current video data packet, if a data coding manner of an Nth video data packet after the current video data packet needs to be switched, the transmit end sends the notification message to the receive end, where the notification message carries the identifier of the coding manner of the media content obtained after the switching, and the serial number of the initial data packet for which the coding manner of the media content needs to be switched, that is, the message carries a serial number of the Nth video data packet and an identifier of a coding manner of the Nth video data packet, so that the receive end determines a decoding manner of the Nth video data packet according to the notification message, where N is a positive integer greater than or equal to 1. Alternatively, the notification message carries the identifier of the coding manner of the media content obtained after the switching, and the information about the location in which the coding manner of the media content needs to be switched. For example, in a case in which time of the transmit end and that of the receive end are synchronized, the notification message includes information about a time at which the coding manner needs to be switched, and the identifier of the data coding manner, so that when decoding a video data packet at a time indicated by the time information, the receive end determines a data decoding manner of the video data packet according to the identifier of the data coding manner. Alternatively, the location information may be information about a byte for which the coding manner of the media content needs to be switched. For example, when acquiring, by means of decoding, a byte indicated by the byte information, the receive end switches a decoding manner of the media content.

The notification message may notify, by using an RTSP SET_PARAMETER ( ) method, the receive end of the identifier of the coding manner of the media content, and the serial number of the initial data packet for which the coding manner of the media content needs to be switched, or the information about the location in which the coding manner of the media content needs to be switched. When decoding the N video data packet after the current video data packet, a decoder of the receive end switches a decoding manner of current media content according to the identifier of the coding manner of the media content in the notification message, and the serial number that is in the notification message and of the initial data packet for which the coding manner of the media content needs to be switched, or the information that is in the notification message and about the location in which the coding manner of the media content needs to be switched.

205: The transmit end sends, to the receive end, an identifier of the coding manner of the media content obtained after the switching, where the identifier is carried in a data packet of the media content, so that the receive end determines a decoding manner of the media content according to the identifier of the coding manner.

Exemplarily, when packing an NAL data packet in a Real-time Transport Protocol (RTP) manner, the transmit end adds the identifier of the coding manner of the media content obtained after the switching to a packet header of an RTP video data packet, so that when receiving the data packet, the receive end decodes, by using the decoder, the packet header of the RTP data packet to determine a decoding manner of the video data packet. If an identifier of a coding manner of the video data packet is the same as an identifier of a coding manner of a last received data packet, a decoding manner of the decoder is not switched; if the identifier of the coding manner of the video data packet is different from the identifier of the coding manner of the last received data packet, the decoding manner of the decoder is switched.

During the foregoing description process, with same picture quality, a compression rate of H.265 is twice that of H.264. However, coding algorithm complexity of H.265 is five times that of H.264, and decoding algorithm complexity is twice to thrice that of H.264. That is, an H.265 coding algorithm increases power consumption of an encoder and a decoder, and increases a burden on a CPU. Therefore, by determining state information of a transmit end and/or a receive end, where the state information includes CPU usage, a network bandwidth, and electricity amount information that are of the transmit end and/or the receive end, and information about media content to be sent by the transmit end, the H.265 coding algorithm may be switched to an H.264 coding algorithm when the H.265 coding algorithm is inapplicable. In this way, a negative effect caused by high complexity of the H.265 coding algorithm is reduced, advantages of the H.265 coding algorithm and the H.264 coding algorithm are brought into play, and user experience is improved in an actual application.

This embodiment of the present invention provides a coding manner switching method, where a transmit end acquires state information of the transmit end and/or a receive end, where the state information includes CPU usage, a network bandwidth, and electricity amount information that are of the transmit end and/or the receive end, and information about media content to be sent by the transmit end; and determines whether at least one piece of information among the state information meets a preset condition, and switches a coding manner of the media content if one piece of information among the state information meets the preset condition; and the transmit end notifies the receive end of a coding manner of the media content, so that the receive end determines a decoding manner of the media content according to the coding manner of the media content. In this way, user experience can be improved as the coding manner is switched.

Figure 3:
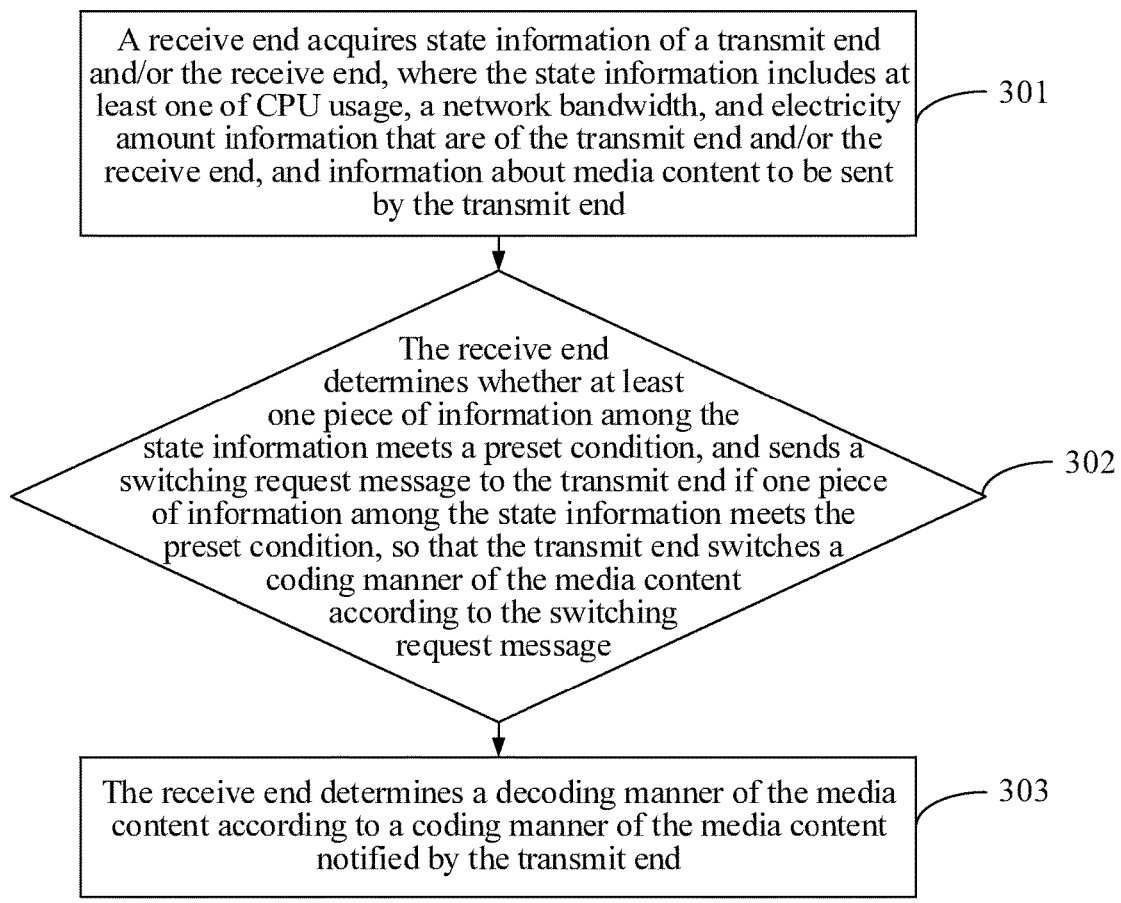
FIG. 3 is a schematic flowchart of a coding manner switching method according to another embodiment of the present invention.

Another embodiment of the present invention provides a coding manner switching method, which, as shown in FIG. 3, includes the following steps.

301: A receive end acquires state information of a transmit end and/or the receive end, where the state information includes at least one of CPU usage, a network bandwidth, and electricity amount information that are of the transmit end and/or the receive end, and information about media content to be sent by the transmit end.

An implementation manner of this step is similar to that of step 101 in the embodiment shown in FIG. 1, and is not described herein again

302: The receive end determines whether at least one piece of information among the state information meets a preset condition, and sends a switching request message to the transmit end if one piece of information among the state information meets the preset condition, so that the transmit end switches a coding manner of the media content according to the switching request message.

An implementation manner of this step is similar to that of step 102 in the embodiment shown in FIG. 1, and is not described herein again.

303: The receive end determines a decoding manner of the media content according to the coding manner of the media content notified by the transmit end.

An implementation manner of this step is similar to that of step 103 in the embodiment shown in FIG. 1, and is not described herein again.

This embodiment of the present invention provides a coding manner switching method, where a receive end acquires state information of a transmit end and/or the receive end, where the state information includes CPU usage, a network bandwidth, and electricity amount information that are of the transmit end and/or the receive end, and information about media content to be sent by the transmit end; and determines whether at least one piece of information among the state information meets a preset condition, and sends a switching request message to the transmit end if one piece of information among the state information meets the preset condition, so that the transmit end switches a coding manner of the media content according to the switching request message. In this way, user experience can be improved as the coding manner of the media content is switched.

Figure 4:
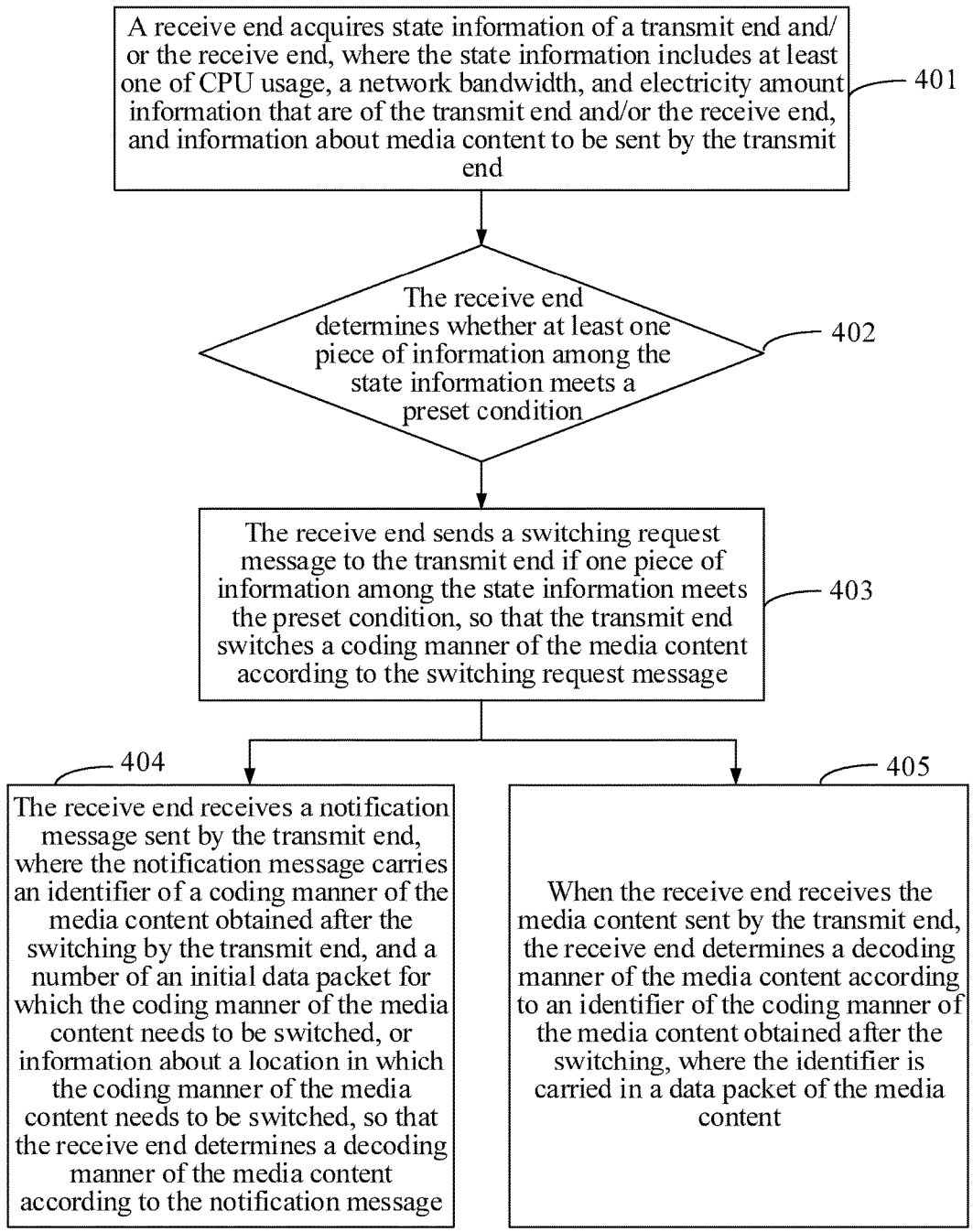
FIG. 4 is a schematic flowchart of a coding manner switching method according to another embodiment of the present invention.

Another embodiment of the present invention provides a coding manner switching method, which, as shown in FIG. 4, includes the following steps.

401: A receive end acquires state information of a transmit end and/or the receive end, where the state information includes at least one of CPU usage, a network bandwidth, and electricity amount information that are of the transmit end and/or the receive end, and information about media content to be sent by the transmit end.

An implementation manner of this step is similar to that of step 201 in the embodiment shown in FIG. 2, and is not described herein again.

402: The receive end determines whether at least one piece of information among the state information meets a preset condition.

An implementation manner of this step is similar to that of step 202 in the embodiment shown in FIG. 2, and is not described herein again.

403: The receive end sends a switching request message to the transmit end if one piece of information among the state information meets the preset condition, so that the transmit end switches a coding manner of the media content according to the switching request message.

An implementation manner of this step is similar to that of step 203 in the embodiment shown in FIG. 2, and is not described herein again.

When it is sequentially determined in a preset manner whether at least one piece of information among the state information meets the preset condition, the receive end sends the switching request message to the transmit end if one piece of information among the state information meets the preset condition, so that the transmit end switches the coding manner of the media content according to the switching request message.

404: The receive end receives a notification message sent by the transmit end, where the notification message carries an identifier of a coding manner of the media content obtained after the switching by the transmit end, and a serial number of an initial data packet for which the coding manner of the media content needs to be switched, or information about a location in which the coding manner of the media content needs to be switched, so that the receive end determines a decoding manner of the media content according to the notification message.

An implementation manner of this step is similar to that of step 204 in the embodiment shown in FIG. 2, and is not described herein again.

405: When the receive end receives the media content sent by the transmit end, the receive end determines a decoding manner of the media content according to an identifier of the coding manner of the media content obtained after the switching, where the identifier is carried in a data packet of the media content.

An implementation manner of this step is similar to that of step 205 in the embodiment shown in FIG. 2, and is not described herein again.

This embodiment of the present invention provides a coding manner switching method, where a receive end acquires state information of a transmit end and/or the receive end, where the state information includes at least one of CPU usage, a network bandwidth, and electricity amount information that are of the transmit end and/or the receive end, and information about media content to be sent by the transmit end; determines whether at least one piece of information among the state information meets a preset condition, and sends a switching request message to the transmit end if one piece of information among the state information meets the preset condition, so that the transmit end switches a coding manner of the media content according to the switching request message; and determines a decoding manner of the media content according to a coding manner of the media content of the transmit end. In this way, user experience can be improved as the coding manner of the media content is switched.

Figure 5:
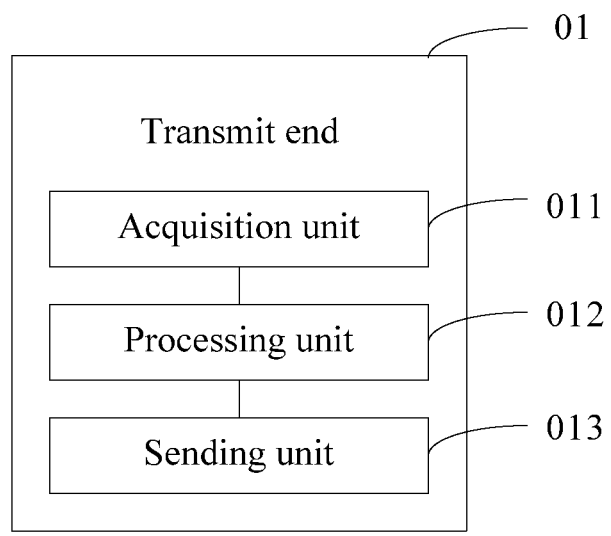
FIG. 5 is a schematic structural diagram of a transmit end according to another embodiment of the present invention.

Another embodiment of the present invention provides a transmit end 01, which, as shown in FIG. 5, includes an acquisition unit 011 configured to acquire state information of the transmit end and/or a receive end, where the state information includes at least one of CPU usage, a network bandwidth, and electricity amount information that are of the transmit end and/or the receive end, and information about media content to be sent by the transmit end; a processing unit 012 configured to determine whether at least one piece of information among the state information meets a preset condition, and switch a coding manner of the media content if one piece of information among the state information meets the preset condition; and a sending unit 013 configured to notify the receive end of a data coding manner of the transmit end, so that the receive end determines a decoding manner of the media content according to the coding manner of the media content.

Optionally, the information about the media content to be sent is a size of the media content to be sent by the transmit end, and/or a resolution of the media content to be sent by the transmit end, and/or a frame rate of the media content to be sent by the transmit end; and the data coding manner is AVC H.264 or HEVC H.265.

Optionally, the processing unit 012 may be configured to, if state information currently determined by the transmit end is the CPU usage, the preset condition is that the CPU usage of the transmit end and/or the CPU usage of the receive end is greater than a first preset threshold; and the processing unit 012 may be configured to, if the CPU usage of the transmit end and/or the CPU usage of the receive end is greater than the first preset threshold, determine, by the processing unit, to switch the HEVC to the AVC.

Optionally, the processing unit 012 may be configured to, if state information currently determined by the transmit end is the network bandwidth, the preset condition is that the network bandwidth is less than a second preset threshold; and the processing unit 012 may be configured to, if the network bandwidth of the transmit end and/or the network bandwidth of the receive end is less than the second preset threshold, determine, by the processing unit, to switch the AVC to the HEVC.

Optionally, the processing unit 012 may be configured to, if state information currently determined by the transmit end is the electricity amount information, the preset condition is that when the transmit end and/or the receive end is not connected to a power source, a remaining capacity of the transmit end and/or the receive end is less than a third preset threshold, where the third preset threshold is an electricity amount required by the transmit end and/or the receive end to complete playing unplayed media content of the media content; and the processing unit 012 may be configured to, if the remaining capacity of the transmit end and/or the receive end is less than the third preset threshold, switch, by the processing unit, the HEVC to the AVC.

Optionally, the processing unit 012 may be configured to, if state information currently determined by the transmit end is the media content to be sent by the transmit end, the preset condition is that the size and/or the resolution and/or the frame rate of the media content to be sent by the transmit end is greater than a fourth preset threshold; and the processing unit 012 may be configured to, if the size and/or the resolution and/or the frame rate of the media content to be sent by the transmit end is greater than the fourth preset threshold, switch, by the transmit end, the AVC to the HEVC.

Optionally, if there are at least two pieces of state information, the processing unit 012 determines whether at least one piece of information among the state information meets a preset condition, and switches the coding manner of the media content if one piece of information among the state information meets the preset condition; or if there are at least two pieces of state information, the processing unit 012 performs weighting on the state information according to weight values of the state information to acquire a weighting result; and the processing unit 012 compares the weighting result with a fifth preset threshold; and if the weighting result is less than the fifth preset threshold, the transmit end switches the AVC to the HEVC.

Optionally, the sending unit 013 may be configured to send a notification message to the receive end, where the notification message carries an identifier of the coding manner of the media content obtained after the switching, and a serial number of an initial data packet for which the coding manner of the media content needs to be switched, or information about a location in which the coding manner of the media content needs to be switched, so that the receive end determines the decoding manner of the media content according to the notification message; or send, by the transmit end to the receive end, an identifier of the coding manner of the media content obtained after the switching, where the identifier is carried in a data packet of the media content, so that the receive end determines the decoding manner of the media content according to the identifier of the coding manner.

This embodiment of the present invention provides a transmit end. The transmit end acquires state information of the transmit end and/or a receive end, where the state information includes at least one of CPU usage, a network bandwidth, and electricity amount information that are of the transmit end and/or the receive end, and information about media content to be sent by the transmit end; determines whether at least one piece of information among the state information meets a preset condition, and switches a coding manner of the media content if one piece of information among the state information meets the preset condition; and notifies the receive end of a coding manner of the media content of the transmit end, so that the receive end determines a decoding manner of the media content according to the coding manner of the media content. In this way, user experience can be improved as the coding manner of the media content is switched.

Figure 6:
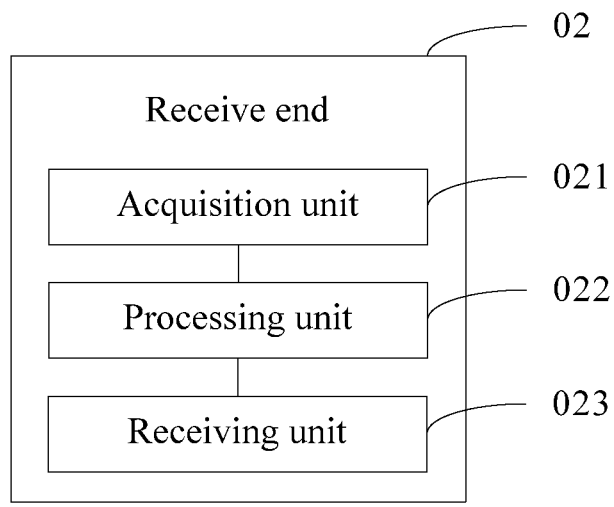
FIG. 6 is a schematic structural diagram of a receive end according to another embodiment of the present invention.

Another embodiment of the present invention provides a receive end 02, which, as shown in FIG. 6, includes an acquisition unit 021 configured to acquire state information of a transmit end and/or the receive end, where the state information includes at least one of CPU usage, a network bandwidth, and electricity amount information that are of the transmit end and/or the receive end, and information about media content to be sent by the transmit end; and a processing unit 022 configured to determine whether at least one piece of information among the state information meets a preset condition, and send a switching request message to the transmit end if one piece of information among the state information meets the preset condition, so that the transmit end switches a coding manner of the media content according to the switching request message, where the processing unit 022 is further configured to determine a decoding manner of the media content according to a coding manner of the media content notified by the transmit end.

Optionally, the information about the media content to be sent is a size of the media content to be sent by the transmit end, and/or a resolution of the media content to be sent by the transmit end, and/or a frame rate of the media content to be sent by the transmit end; and the coding manner is AVC H.264 or HEVC H.265.

Optionally, the processing unit 022 may be configured to, if state information currently determined by the receive end is the CPU usage, the preset condition is that the CPU usage of the transmit end and/or the CPU usage of the receive end is greater than a first preset threshold; and the processing unit 022 may be configured to, if the CPU usage of the transmit end and/or the CPU usage of the receive end is greater than the first preset threshold, send, by the receive end, the switching request message to the transmit end, so that the transmit end switches the HEVC to the AVC according to the switching request message.

Optionally, the processing unit 022 may be configured to, if state information currently determined by the receive end is the network bandwidth, the preset condition is that the network bandwidth is less than a second preset threshold; and the processing unit 022 may be configured to, if the network bandwidth information of the transmit end and/or the network bandwidth information of the receive end is less than the second preset threshold, send, by the receive end, the switching request message to the transmit end, so that the transmit end switches the AVC to the HEVC according to the switching request message.

Optionally, the processing unit 022 may be configured to, if state information currently determined by the receive end is the electricity amount information, the preset condition is that when the transmit end and/or the receive end is not connected to a power source, a remaining capacity of the transmit end and/or the receive end is less than a third preset threshold, where the third preset threshold is an electricity amount required by the transmit end and/or the receive end to complete playing unplayed media content of the media content; and the processing unit 022 may be configured to, if the remaining capacity of the transmit end and/or the receive end is less than the third preset threshold, send, by the receive end, the switching request message to the transmit end, so that the transmit end switches the HEVC to the AVC according to the switching request message.

Optionally, the processing unit 022 may be configured to, if state information currently determined by the receive end is the information about the media content to be sent by the transmit end, the preset condition is that the size and/or the resolution and/or the frame rate of the media content to be sent by the transmit end is greater than a fourth preset threshold; and the processing unit 022 may be configured to, if the size and/or the resolution and/or the frame rate of the media content to be sent by the transmit end is greater than the fourth preset threshold, send the switching request message to the transmit end, so that the transmit end switches the AVC to the HEVC according to the switching request message.

Optionally, if there are at least two pieces of state information, the processing unit 022 determines whether at least one piece of information among the state information meets a preset condition, and sends the switching request message to the transmit end if one piece of information among the state information meets the preset condition, so that the transmit end switches the coding manner of the media content according to the switching request message; or if there are at least two pieces of state information, the processing unit 024 may perform weighting on the state information according to weight values of the state information to acquire a weighting result; and the processing unit 022 is configured to compare the weighting result with a fifth preset threshold; and if the weighting result is less than the fifth preset threshold, the receive end sends the switching request message to the transmit end, so that the transmit end switches the AVC to the HEVC according to the switching request message.

Optionally, if the receive end decodes a current video data packet, a receiving unit 023 receives a notification message sent by the transmit end, where the notification message carries an identifier of the coding manner of the media content obtained after the switching by the transmit end, and a serial number of an initial data packet for which the coding manner of the media content needs to be switched, or information about a location in which the coding manner of the media content needs to be switched, so that the processing unit determines the decoding manner of the media content according to the notification message; or when the receiving unit receives the media content sent by the transmit end, the processing unit determines the decoding manner of the media content according to an identifier of the coding manner of the media content obtained after the switching, where the identifier is carried in a data packet of the media content.

This embodiment of the present invention provides a receive end. The receive end acquires state information of a transmit end and/or the receive end, where the state information includes at least one of CPU usage, a network bandwidth, and electricity amount information that are of the transmit end and/or the receive end, and information about media content to be sent by the transmit end; determines whether at least one piece of information among the state information meets a preset condition, and sends a switching request message to the transmit end if one piece of information among the state information meets the preset condition, so that the transmit end switches a coding manner of the media content according to the switching request message; and determines a data decoding manner of the media content according to a coding manner of the media content of the transmit end. In this way, user experience can be improved as the coding manner of the media content is switched.

Figure 7:
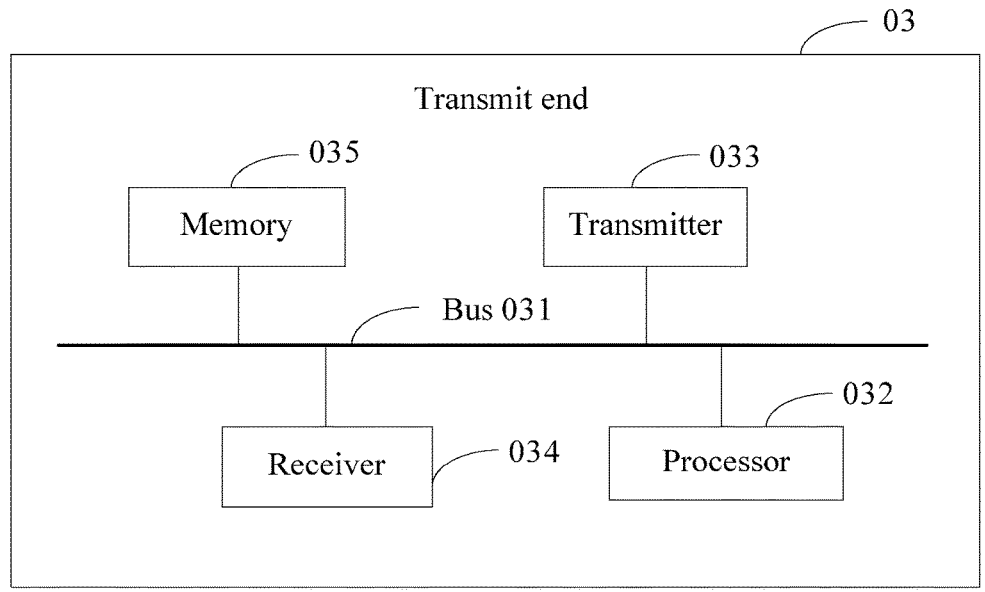
FIG. 7 is a schematic structural diagram of a transmit end according to another embodiment of the present invention.

Another embodiment of the present invention provides a transmit end 03. As shown in FIG. 7, the transmit end 03 includes a bus 031, a processor 032, a transmitter 033, a receiver 034, and a memory 035, where the memory 035 is configured to store an instruction; the processor 032 is configured to execute the instruction to acquire state information of the transmit end and/or a receive end, where the state information includes at least one of CPU usage, a network bandwidth, and electricity amount information that are of the transmit end and/or the receive end, and information about media content to be sent by the transmit end; and the processor 032 is configured to execute the instruction to determine whether at least one piece of information among the state information meets a preset condition, and switch a coding manner of the media content if one piece of information among the state information meets the preset condition; and the transmitter 033 is configured to execute the instruction to notify the receive end of the coding manner of the media content of the transmit end, so that the receive end determines a decoding manner of the media content according to the coding manner of the media content.

In this embodiment of the present invention, optionally, the information about the media content to be sent is a size of the media content to be sent by the transmit end, and/or a resolution of the media content to be sent by the transmit end, and/or a frame rate of the media content to be sent by the transmit end; and the data coding manner is AVC H.264 or HEVC H.265.

In this embodiment of the present invention, optionally, if the state information currently determined by the transmit end is the CPU usage, the preset condition is that the CPU usage of the transmit end and/or the CPU usage of the receive end is greater than a first preset threshold; and the processor 032 is configured to, if the CPU usage of the transmit end and/or the CPU usage of the receive end is greater than the first preset threshold, switch the HEVC to the AVC.

In this embodiment of the present invention, optionally, if the state information currently determined by the transmit end is the network bandwidth, the preset condition is that the network bandwidth is less than a second preset threshold; and that the processor 032 is configured to execute the instruction includes, if the network bandwidth of the transmit end and/or the network bandwidth of the receive end is less than the second preset threshold, the processor 032 is configured to switch the AVC to the HEVC.

In this embodiment of the present invention, optionally, if the state information currently determined by the transmit end is the electricity amount information, the preset condition is that when the transmit end and/or the receive end is not connected to a power source, a remaining capacity of the transmit end and/or the receive end is less than a third preset threshold, where the third preset threshold is an electricity amount required by the transmit end and/or the receive end to complete playing unplayed media content of the media content; and that the processor 032 is configured to execute the instruction includes, if the remaining capacity of the transmit end and/or the receive end is less than the third preset threshold, the processor is configured to switch the HEVC to the AVC.

In this embodiment of the present invention, optionally, if the state information currently determined by the transmit end is the information about the media content to be sent by the transmit end, the preset condition is that the size and/or the resolution and/or the frame rate of the media content to be sent by the transmit end is greater than a fourth preset threshold; and that the processor 032 is configured to execute the instruction includes, if the size and/or the resolution and/or the frame rate of the media content to be sent by the transmit end is greater than the fourth preset threshold, the processor 032 is configured to switch the AVC to the HEVC.

In this embodiment of the present invention, optionally, if there are at least two pieces of information among the state information, the processor 032 determines whether the state information meets a preset condition, and switches the coding manner of the media content if one piece of information among the state information meets the preset condition; or the transmit end performs weighting on the state information according to weight values of the state information to acquire a weighting result; and the transmit end compares the weighting result with a fifth preset threshold; and if the weighting result is less than the fifth preset threshold, the transmit end switches the AVC to the HEVC.

In this embodiment of the present invention, optionally, that the transmitter 033 is configured to execute the instruction to notify the receive end of a coding manner of the media content of the transmit end, so that the receive end determines a decoding manner of the media content according to the coding manner of the media content includes sending, by the transmit end, a notification message to the receive end, where the notification message carries an identifier of the coding manner of the media content obtained after the switching, and a serial number of an initial data packet for which the coding manner of the media content needs to be switched, or information about a location in which the coding manner of the media content needs to be switched, so that the receive end determines the decoding manner of the media content according to the notification message; or sending, by the transmit end to the receive end, an identifier of the coding manner of the media content obtained after the switching, where the identifier is carried in a data packet of the media content, so that the receive end determines the decoding manner of the media content according to the identifier of the coding manner.

This embodiment of the present invention provides a transmit end. The transmit end acquires state information of the transmit end and/or a receive end, where the state information includes at least one of CPU usage, a network bandwidth, and electricity amount information that are of the transmit end and/or the receive end, and information about media content to be sent by the transmit end; determines whether at least one piece of information among the state information meets a preset condition, and switches a coding manner of the media content if one piece of information among the state information meets the preset condition; and notifies the receive end of a coding manner of the media content of the transmit end, so that the receive end determines a decoding manner of the media content according to the coding manner of the media content. In this way, user experience can be improved as the coding manner of the media content is switched.

Figure 8:
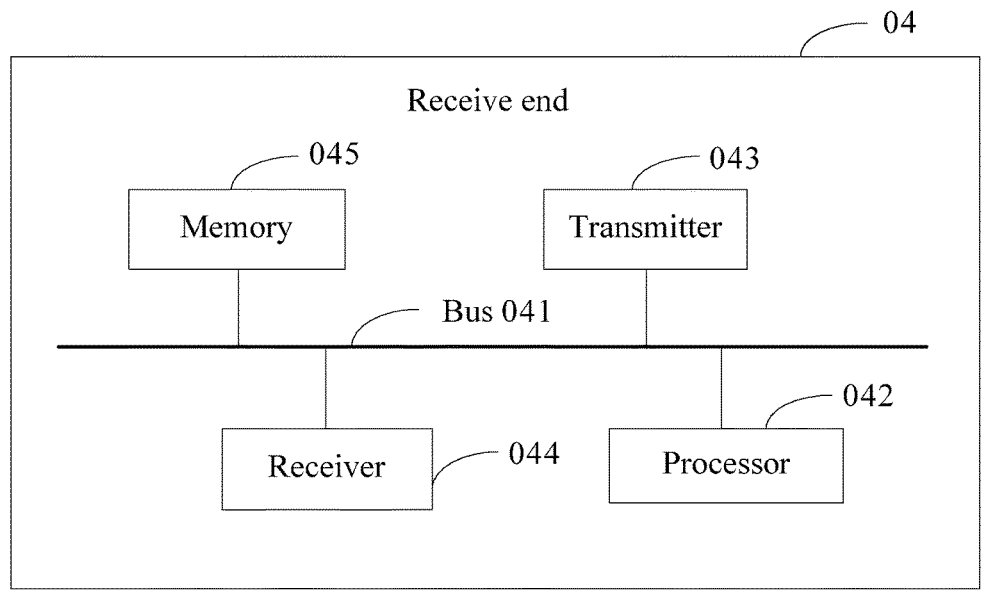
FIG. 8 is a schematic structural diagram of a receive end according to another embodiment of the present invention.

Another embodiment of the present invention provides a receive end 04. As shown in FIG. 8, the receive end 04 includes a bus 041, a processor 042, a transmitter 043, a receiver 044, and a memory 045, where the memory 045 is configured to store an instruction; and the processor 042 is configured to execute the instruction to acquire state information of a transmit end and/or the receive end, where the state information includes at least one of CPU usage, network bandwidth information, and electricity amount information that are of the transmit end and/or the receive end, and information about media content to be sent by the transmit end; the processor 042 is configured to execute the instruction to determine whether at least one piece of information among the state information meets a preset condition, and send a switching request message to the transmit end if one piece of information among the state information meets the preset condition, so that the transmit end switches a coding manner of the media content according to the switching request message; and the processor 042 is configured to execute the instruction to determine, by the receive end, a decoding manner of the media content according to a coding manner of the media content notified by the transmit end.

In this embodiment of the present invention, optionally, the information about the media content to be sent is a size of the media content to be sent by the transmit end, and/or a resolution of the media content to be sent by the transmit end, and/or a frame rate of the media content to be sent by the transmit end; and the coding manner is AVC H.264 or HEVC H.265.

In this embodiment of the present invention, optionally, the processor 042 is if the state information currently determined by the receive end is the CPU usage, the preset condition is that the CPU usage of the transmit end and/or the CPU usage of the receive end is greater than a first preset threshold; and the processor 042 is configured to execute the instruction to, if the CPU usage of the transmit end and/or the CPU usage of the receive end is greater than the first preset threshold, send, by the processor, the switching request message to the transmit end, so that the transmit end switches the HEVC to the AVC according to the switching request message.

In this embodiment of the present invention, optionally, if the state information currently determined by the receive end is the network bandwidth, the preset condition is that the network bandwidth is less than a second preset threshold; and that the processor 042 is configured to execute the instruction includes, if the network bandwidth of the transmit end and/or the network bandwidth of the receive end is less than the second preset threshold, sending, by the processor, the switching request message to the transmit end, so that the transmit end switches the AVC to the HEVC according to the switching request message.

In this embodiment of the present invention, optionally, if the state information currently determined by the receive end is the electricity amount information, the preset condition is that when the transmit end and/or the receive end is not connected to a power source, a remaining capacity of the transmit end and/or the receive end is less than a third preset threshold, where the third preset threshold is an electricity amount required by the transmit end and/or the receive end to complete playing unplayed media content of the media content; and that the processor 042 is configured to execute the instruction includes, if the remaining capacity of the transmit end and/or the receive end is less than the third preset threshold, sending, by the processor, the switching request message to the transmit end, so that the transmit end switches the HEVC to the AVC according to the switching request message.

In this embodiment of the present invention, optionally, if the state information currently determined by the receive end is the information about the media content to be sent by the transmit end, the preset condition is that the size and/or the resolution and/or the frame rate of the media content to be sent by the transmit end is greater than a fourth preset threshold; and that the processor 042 is configured to execute the instruction includes, if the size and/or the resolution and/or the frame rate of the media content to be sent by the transmit end is greater than the fourth preset threshold, sending, by the processor, the switching request message to the transmit end, so that the transmit end switches the AVC to the HEVC according to the switching request message.

In this embodiment of the present invention, optionally, if there are at least two pieces of information among the state information, the receive end determines whether at least one piece of information among the state information meets a preset condition, and sends the switching request message to the transmit end if one piece of information among the state information meets the preset condition, so that the transmit end switches the coding manner of the media content according to the switching request message; or if there are at least two pieces of state information, the processor 042 is configured to perform weighting on the state information according to weight values of the state information to acquire a weighting result; and the receive end compares the weighting result with a fifth preset threshold; and if the weighting result is less than the fifth preset threshold, the receive end sends the switching request message to the transmit end, so that the transmit end switches the AVC to the HEVC according to the switching request message.

In this embodiment of the present invention, optionally, that the processor 042 is configured to determine, by the receive end, a decoding manner of the media content according to a coding manner of the media content notified by the transmit end includes receiving, by the processor, a notification message sent by the transmit end, where the notification message carries an identifier of the coding manner of the media content obtained after the switching by the transmit end, and a serial number of an initial data packet for which the coding manner of the media content needs to be switched, or information about a location in which the coding manner of the media content needs to be switched, so that the receive end determines the decoding manner of the media content according to the notification message; or when the receive end receives the media content sent by the transmit end, the processor determines the decoding manner of the media content according to an identifier of the coding manner of the media content obtained after the switching, where the identifier is carried in a data packet of the media content.

This embodiment of the present invention provides a receive end. The receive end acquires state information of a transmit end and/or the receive end, where the state information includes CPU usage, a network bandwidth, and electricity amount information that are of the transmit end and/or the receive end, and information about media content to be sent by the transmit end; determines whether at least one piece of information among the state information meets a preset condition, and sends a switching request message to the transmit end if one piece of information among the state information meets the preset condition, so that the transmit end switches a coding manner of the media content according to the switching request message; and determines a decoding manner according to a coding manner of the media content of the transmit end. In this way, user experience can be improved as the coding manner of the media content is switched.

According to a second embodiment, a coding manner switching method is provided, where the method includes acquiring, by a receive end, state information of a transmit end and/or the receive end, where the state information includes at least one of CPU usage, a network bandwidth, and electricity amount information that are of the transmit end and/or the receive end, and information about media content to be sent by the transmit end; determining, by the receive end, whether at least one piece of information among the state information meets a preset condition; and sending a switching request message to the transmit end if one piece of information among the state information meets the preset condition, so that the transmit end switches a coding manner of the media content according to the switching request message; and determining, by the receive end, a decoding manner of the media content according to the coding manner of the media content notified by the transmit end.

With reference to the second embodiment, in a first possible implementation manner of the second embodiment, the information about the media content to be sent is a size of the media content to be sent by the transmit end, and/or a resolution of the media content to be sent by the transmit end, and/or a frame rate of the media content to be sent by the transmit end; and the coding manner is AVC H.264 or HEVC H.265.

With reference to the second embodiment or the first possible implementation manner of the second embodiment, in a second possible implementation manner of the second embodiment, if the state information currently determined by the receive end is the CPU usage, the preset condition is that the CPU usage of the transmit end and/or the CPU usage of the receive end is greater than a first preset threshold; and the sending the switching request message to the transmit end if one piece of information among the state information meets the preset condition includes, if the CPU usage of the transmit end and/or the CPU usage of the receive end is greater than the first preset threshold, sending, by the receive end, the switching request message to the transmit end, so that the transmit end switches the HEVC to the AVC according to the switching request message.

With reference to the second embodiment or the first possible implementation manner of the second embodiment, in a third possible implementation manner of the second embodiment, if the state information currently determined by the receive end is the network bandwidth, the preset condition is that the network bandwidth is less than a second preset threshold; and the sending the switching request message to the transmit end if one piece of information among the state information meets the preset condition includes, if the network bandwidth of the transmit end and/or the network bandwidth of the receive end is less than the second preset threshold, sending, by the receive end, the switching request message to the transmit end, so that the transmit end switches the AVC to the HEVC according to the switching request message.

With reference to the second embodiment or the first possible implementation manner of the second embodiment, in a fourth possible implementation manner of the second embodiment, if the state information currently determined by the receive end is the electricity amount information, the preset condition is that when the transmit end and/or the receive end is not connected to a power source, a remaining capacity of the transmit end and/or the receive end is less than a third preset threshold, where the third preset threshold is an electricity amount required by the transmit end and/or the receive end to complete playing unplayed media content of the media content; and the sending the switching request message to the transmit end if one piece of information among the state information meets the preset condition includes, if the remaining capacity of the transmit end and/or the receive end is less than the third preset threshold, sending, by the receive end, the switching request message to the transmit end, so that the transmit end switches the HEVC to the AVC according to the switching request message.

With reference to the second embodiment or the first possible implementation manner of the second embodiment, in a fifth possible implementation manner of the second embodiment, if the state information currently determined by the receive end is the information about the media content to be sent by the transmit end, the preset condition is that the size and/or the resolution and/or the frame rate of the media content to be sent by the transmit end is greater than a fourth preset threshold; and the sending the switching request message to the transmit end if one piece of information among the state information meets the preset condition includes, if the size and/or the resolution and/or the frame rate of the media content to be sent by the transmit end is greater than the fourth preset threshold, sending, by the receive end, the switching request message to the transmit end, so that the transmit end switches the AVC to the HEVC according to the switching request message.

With reference to the second embodiment or the first possible implementation manner of the second embodiment, in a sixth possible implementation manner of the second embodiment, if there are at least two pieces of information among the state information, the receive end determines whether at least one piece of information among the state information meets the preset condition, and sends the switching request message to the transmit end if one piece of information among the state information meets the preset condition, so that the transmit end switches the coding manner of the media content according to the switching request message; or the receive end performs weighting on the state information according to weight values of the state information to acquire a weighting result; and the receive end compares the weighting result with a fifth preset threshold; and if the weighting result is less than the fifth preset threshold, the receive end sends the switching request message to the transmit end, so that the transmit end switches the AVC to the HEVC according to the switching request message.

With reference to any one of the second to the sixth possible implementation manners of the second embodiment, in a seventh possible implementation manner of the second embodiment, the determining, by the receive end, a decoding manner of the media content according to the coding manner of the media content notified by the transmit end includes receiving, by the receive end, a notification message sent by the transmit end, where the notification message carries an identifier of the coding manner of the media content obtained after the switching by the transmit end, and a serial number of an initial data packet for which the coding manner of the media content needs to be switched, or information about a location in which the coding manner of the media content needs to be switched, so that the receive end determines the decoding manner of the media content according to the notification message; or when the receive end receives the media content sent by the transmit end, determining, by the receive end, the decoding manner of the media content according to an identifier of the coding manner of the media content obtained after the switching, where the identifier is carried in a data packet of the media content.

According to a fourth embodiment, a receive end is provided, where the receive end includes an acquisition unit configured to acquire, state information of a transmit end and/or the receive end, where the state information includes at least one of CPU usage, a network bandwidth, and electricity amount information that are of the transmit end and/or the receive end, and information about media content to be sent by the transmit end; and a processing unit configured to determine whether at least one piece of information among the state information meets a preset condition, and send a switching request message to the transmit end if one piece of information among the state information meets the preset condition, so that the transmit end switches a coding manner of the media content according to the switching request message, where the processing unit is further configured to determine a decoding manner of the media content according to the coding manner of the media content notified by the transmit end.

With reference to the fourth embodiment, in a first possible implementation manner of the fourth embodiment, the information about the media content to be sent is a size of the media content to be sent by the transmit end, and/or a resolution of the media content to be sent by the transmit end, and/or a frame rate of the media content to be sent by the transmit end; and the coding manner is AVC H.264 or HEVC H.265.

With reference to the fourth embodiment or the first possible implementation manner of the fourth embodiment, in a second possible implementation manner of the fourth embodiment, if the state information currently determined by the receive end is the CPU usage, the preset condition is that the CPU usage of the transmit end and/or the CPU usage of the receive end is greater than a first preset threshold; and the processing unit is configured to, if the CPU usage of the transmit end and/or the CPU usage of the receive end is greater than the first preset threshold, send the switching request message to the transmit end, so that the transmit end switches the HEVC to the AVC according to the switching request message.

With reference to the fourth embodiment or the first possible implementation manner of the fourth embodiment, in a third possible implementation manner of the fourth embodiment, if the state information currently determined by the receive end is the network bandwidth, the preset condition is that the network bandwidth is less than a second preset threshold; and the processing unit is configured to, if the network bandwidth of the transmit end and/or the network bandwidth of the receive end is less than the second preset threshold, send the switching request message to the transmit end, so that the transmit end switches the AVC to the HEVC according to the switching request message.

With reference to the fourth embodiment or the first possible implementation manner of the fourth embodiment, in a fourth possible implementation manner of the fourth embodiment, if the state information currently determined by the receive end is the electricity amount information, the preset condition is that when the transmit end and/or the receive end is not connected to a power source, a remaining capacity of the transmit end and/or the receive end is less than a third preset threshold, where the third preset threshold is an electricity amount required by the transmit end and/or the receive end to complete playing unplayed media content of the media content; and the processing unit is configured to, if the remaining capacity of the transmit end and/or the receive end is less than the third preset threshold, send the switching request message to the transmit end, so that the transmit end switches the HEVC to the AVC according to the switching request message.

With reference to the fourth embodiment or the first possible implementation manner of the fourth embodiment, in a fifth possible implementation manner of the fourth embodiment, if the state information currently determined by the receive end is the information about the media content to be sent by the transmit end, the preset condition is that the size and/or the resolution and/or the frame rate of the media content to be sent by the transmit end is greater than a fourth preset threshold; and the processing unit is configured to, if the size and/or the resolution and/or the frame rate of the media content to be sent by the transmit end is greater than the fourth preset threshold, send the switching request message to the transmit end, so that the transmit end switches the AVC to the HEVC according to the switching request message.

With reference to the fourth embodiment or the second possible implementation manner of the fourth embodiment, in a sixth possible implementation manner of the fourth embodiment, if there are at least two pieces of information among the state information, the processing unit determines whether at least one piece of information among the state information meets the preset condition, and sends the switching request message to the transmit end if one piece of information among the state information meets the preset condition, so that the transmit end switches the coding manner of the media content according to the switching request message; or the processing unit performs weighting on the state information according to weight values of the state information to acquire a weighting result; and the processing unit compares the weighting result with a fifth preset threshold; and if the weighting result is less than the fifth preset threshold, the receive end sends the switching request message to the transmit end, so that the transmit end switches the AVC to the HEVC according to the switching request message.

With reference to the fourth embodiment or the first possible implementation manner to the sixth possible implementation manner of the fourth embodiment, in a seventh possible implementation manner of the fourth embodiment, a receiving unit receives a notification message sent by the transmit end, where the notification message carries an identifier of the coding manner of the media content obtained after the switching by the transmit end, and a serial number of an initial data packet for which the coding manner of the media content needs to be switched, or information about a location in which the coding manner of the media content needs to be switched, so that the processing unit determines the decoding manner of the media content according to the notification message; or when the receiving unit receives the media content sent by the transmit end, the processing unit determines the decoding manner of the media content according to an identifier of the coding manner of the media content obtained after the switching, where the identifier is carried in a data packet of the media content.

In the several embodiments provided in this application, it should be understood that the disclosed method, receive end, and transmit end can be implemented in other manners. For example, the described device embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

In addition, functional units of the devices and systems in the embodiments of the present invention may be integrated into one processing unit, or each of the units may exist alone physically, or two or more units are integrated into one unit. The integrated unit may be implemented in a form of hardware, or may be implemented in a form of hardware in addition to a software functional unit.

A person of ordinary skill in the art may understand that all or some of the steps of the foregoing method embodiments may be implemented by a program instructing relevant hardware. The foregoing program may be stored in a computer-readable storage medium. When the program runs, the steps of the foregoing method embodiments are performed. The foregoing storage medium includes any medium that can store program code, such as a universal serial bus (USB) flash drive, a removable hard disk, a read-only memory (ROM), a random access memory (RAM), a magnetic disk, or an optical disc.

The foregoing descriptions are merely specific implementation manners of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A coding manner switching method, comprising:
   acquiring, by a transmit end, state information, the state information comprising at least one of central processing unit (CPU) usage, a network bandwidth, electricity amount information that corresponds to at least one of the transmit end or a receive end, or information about media content from the transmit end, the state information being at least one of state information of the transmit end state information of a receive end, or state information of the transmit end and the receive end, and the information about the media content from the transmit end being at least one of a size of the media content from the transmit end, a resolution of the media content from the transmit end, or a frame rate of the media content from the transmit end;
   determining, by the transmit end, whether at least one piece of information among the state information meets a preset condition;
   switching a coding manner of the media content when one piece of information among the state information meets the preset condition, the coding manner being one of an Advanced Video Coding or a High Efficiency Video Coding; and
   notifying, by the transmit end, the receive end of the coding manner of the media content of the transmit end such that the receive end is capable of determining a decoding manner of the media content according to the coding manner of the media content, the preset condition being that the network bandwidth is less than a first preset threshold when the state information currently determined by the transmit end is the network bandwidth, the coding manner of the media content being switched when one piece of information among the state information meets the preset condition comprising switching, by the transmit end, the Advanced Video Coding to the High Efficiency Video Coding when the network bandwidth is less than the first preset threshold, and the network bandwidth being at least one of the network bandwidth of the transmit end, the network bandwidth of the receive end, or the network bandwidth of the transmit end and the receive end.

2. A transmit end, comprising:
   a memory comprising instructions; and
   a processor coupled to the memory, the instructions causing the processor to be configured to:
      acquire state information, the state information comprising at least one of central processing unit (CPU) usage, a network bandwidth, electricity amount information corresponding to at least one of the transmit end or a receive end, or information about media content from the transmit end, the state information being at least one of state information of the transmit end, state information of the receive end, or state information of the transmit end and the receive end, and the information about the media content from the transmit end being at least one of a size of the media content from the transmit end, a resolution of the media content from the transmit end, or a frame rate of the media content from the transmit end;
      determine whether at least one piece of information among the state information meets a preset condition;
      switch a coding manner of the media content when one piece of information among the state information meets the preset condition, the coding manner being one of an Advanced Video Coding or a High Efficiency Video Coding; and
      notify the receive end of the coding manner of the transmit end such that the receive end is capable of determining a decoding manner of the media content according to the coding manner of the media content, the preset condition being that the CPU usage is greater than a first preset threshold when the state information currently determined by the transmit end is the CPU usage, the instructions further causing the processor to be configured to switch the High Efficiency Video Coding to the Advanced Video Coding when the CPU usage is greater than the first reset threshold, and the CPU usage being at least one of the CPU usage of the transmit end, the CPU usage of the receive end, or the CPU usage of the transmit end and the receive end.

3. A transmit end, comprising:

a memory comprising instructions; and a processor coupled to the memory, the instructions causing the processor to be configured to:

acquire state information, the state information comprising at least one of central processing unit (CPU) usage, a network bandwidth, electricity amount information corresponding to at least one of the transmit end or a receive end, or information about media content from the transmit end, the state information being at least one of state information of the transmit end, state information of the receive end, or state information of the transmit end and the receive end, and the information about the media content from the transmit end being at least one of a size of the media content from the transmit end, a resolution of the media content from the transmit end, or a frame rate of the media content from the transmit end;

determine whether at least one piece of information among the state information meets a preset condition;

switch a coding manner of the media content when one piece of information among the state information meets the preset condition, the coding manner being one of an Advanced Video Coding or a High Efficiency Video Coding; and notify the receive end of the coding manner of the transmit end such that the receive end is capable of determining a decoding manner of the media content according to the coding manner of the media content, the preset condition being that the network bandwidth is less than a first preset threshold when the state information currently determined by the transmit end is the network bandwidth, the instructions further causing the processor to be configured to switch the Advanced Video Coding to the High Efficiency Video Coding when the network bandwidth is less than the second preset threshold, and the network bandwidth being at least one of the network bandwidth of the transmit end, the network bandwidth of the receive end, or the network bandwidth of the transmit end and the receive end.

* * * * *

UNITED STATES PATENT AND TRADEMARK OFFICE
CERTIFICATE OF CORRECTION

PATENT NO. : 10,171,815 B2
APPLICATION NO. : 14/813458
DATED : January 1, 2019
INVENTOR(S) : Zhenwei Shan It is certified that error appears in the above-identified patent and that said Letters Patent is hereby corrected as shown below:

On the Title Page

Item (30), delete "201310221059" and insert --201310221059.9--

In the Claims

Column 33, Line 65 Claim 1: insert --,-- after "transmit end"

Column 35, Line 1 Claim 2: delete "reset" and insert --preset--

Signed and Sealed this
Nineteenth Day of February, 2019

Andrei Iancu
*Director of the United States Patent and Trademark Office*